US009010683B2

(12) United States Patent
Gundlach et al.

(10) Patent No.: US 9,010,683 B2
(45) Date of Patent: Apr. 21, 2015

(54) RAIL RECOVERY SYSTEM FOR AIRCRAFT

(75) Inventors: John Gundlach, Manassas, VA (US); Jean-Marie Bourven, Falls Church, VA (US); Francesco Giannini, Vienna, VA (US); Steven Petullo, Fairfax, VA (US); Thomas Clancy, Washington, DC (US)

(73) Assignee: Aurora Flight Sciences Corporation, Manassas, VA (US)

( * ) Notice: Subject to any disclaimer, the term of this patent is extended or adjusted under 35 U.S.C. 154(b) by 15 days.

(21) Appl. No.: 13/444,297

(22) Filed: Apr. 11, 2012

(65) Prior Publication Data

US 2013/0082137 A1 Apr. 4, 2013

Related U.S. Application Data

(60) Provisional application No. 61/541,429, filed on Sep. 30, 2011.

(51) Int. Cl.
 *B64F 1/02* (2006.01)
 *B64C 25/68* (2006.01)
 *B64C 39/02* (2006.01)

(52) U.S. Cl.
 CPC . *B64C 25/68* (2013.01); *B64F 1/02* (2013.01); *B64C 39/024* (2013.01); *B64C 2201/182* (2013.01)

(58) Field of Classification Search
 USPC ............... 244/110 C, 110 B, 110 F
 See application file for complete search history.

(56) References Cited

U.S. PATENT DOCUMENTS

| | | | | |
|---|---|---|---|---|
| 1,836,010 A | * | 12/1931 | Audrain | 244/63 |
| 1,912,723 A | | 6/1933 | Perkins | |
| 2,488,050 A | * | 11/1949 | Brodie | 244/110 F |
| 3,484,061 A | * | 12/1969 | Niemkiewicz | 244/110 R |
| 4,809,933 A | * | 3/1989 | Buzby et al. | 244/110 C |
| 5,054,717 A | | 10/1991 | Taylor | |
| 5,109,788 A | | 5/1992 | Heinzmann | |
| 5,560,568 A | | 10/1996 | Schmittle | |
| 5,583,311 A | | 12/1996 | Rieger | |

(Continued)

FOREIGN PATENT DOCUMENTS

GB 2416154 A 1/2006

OTHER PUBLICATIONS

Crane (machine) from Wikipedia, the free encyclopedia, retrieved from <http://en.wikipedia.org/wiki/Crane_(machine)> on Mar. 22, 2012 (19 pages).

(Continued)

*Primary Examiner* — Joseph W Sanderson
*Assistant Examiner* — Keith L Dixon
(74) *Attorney, Agent, or Firm* — Katten Muchin Rosenman LLP

(57) ABSTRACT

The present invention's side-arm recovery system enables large Unmanned Aircraft Systems (UASs) to operate from small vessels or from ground sites with a minimal footprint. The side-arm recovery system allows arresting an UAS independent of a runway. On the ground or on a ship, the system makes use of a specialized crane system that includes capture and energy absorption devices. A fuselage-mounted top hook snags a horizontal cable and the arresting forces act in the plane of symmetry through the central structure of the UAS. After the capture energy is absorbed, the recovery system safely lowers the aerial vehicle to a ground handling cart. The same system can be combined into a launcher and retriever system which further reduces the footprint by eliminating the need for a separate launcher.

23 Claims, 24 Drawing Sheets

(56) References Cited

U.S. PATENT DOCUMENTS

| | | | |
|---|---|---|---|
| 5,716,032 A | 2/1998 | McIngvale | |
| 6,264,140 B1* | 7/2001 | McGeer et al. | 244/110 F |
| 6,604,732 B1 | 8/2003 | Brinker | |
| 7,066,430 B2 | 6/2006 | Dennis et al. | |
| 7,114,680 B2* | 10/2006 | Dennis | 244/63 |
| 7,143,974 B2* | 12/2006 | Roeseler et al. | 244/63 |
| 7,143,976 B2 | 12/2006 | Snediker et al. | |
| 7,165,745 B2 | 1/2007 | McGeer et al. | |
| 7,175,135 B2* | 2/2007 | Dennis et al. | 244/110 C |
| 7,219,856 B2* | 5/2007 | Watts et al. | 244/110 F |
| 7,410,125 B2* | 8/2008 | Steele | 244/110 E |
| 7,472,866 B2* | 1/2009 | Heaston et al. | 244/63 |
| 7,578,467 B2* | 8/2009 | Goodrich | 244/110 C |
| 7,611,094 B2 | 11/2009 | Rom | |
| 7,686,247 B1 | 3/2010 | Monson et al. | |
| 7,785,031 B2* | 8/2010 | Vellozzi et al. | 404/6 |
| 7,806,366 B2 | 10/2010 | Jackson | |
| 7,954,758 B2 | 6/2011 | McGeer et al. | |
| 8,276,844 B2* | 10/2012 | Kariv | 244/110 C |
| 8,313,057 B2* | 11/2012 | Rednikov | 244/110 R |
| 2006/0186266 A1 | 8/2006 | Kennedy | |
| 2007/0228214 A1 | 10/2007 | Horak | |
| 2008/0308673 A1 | 12/2008 | Liu | |
| 2009/0107386 A1 | 4/2009 | Sampson et al. | |
| 2009/0146002 A1 | 6/2009 | Lovette | |
| 2009/0166469 A1 | 7/2009 | Prevost et al. | |
| 2009/0189016 A1 | 7/2009 | Heppe et al. | |
| 2009/0212157 A1 | 8/2009 | Arlton et al. | |
| 2009/0242693 A1 | 10/2009 | Urnes, Sr. | |
| 2009/0294584 A1* | 12/2009 | Lovell et al. | 244/110 F |
| 2009/0314883 A1 | 12/2009 | Arlton et al. | |
| 2010/0123041 A1 | 5/2010 | Nair et al. | |
| 2011/0127378 A1 | 6/2011 | McDonnell | |

OTHER PUBLICATIONS

Iowa class batleship, from Wikipedia, the free encyclopedia, retrived from <http://en.wikipedia.org/wiki/Iowa_class_battleship> on Mar. 5, 2012 (22 pages).

Sea state, from Wikipedia, the free encyclopedia, retrieved from <http://en.wikipedia.org/wiki/Sea_state> on May 6, 2012 (4 pages).

SkyHook (TM) brochure, The Insitu Group, 2004 (4 pages).

Transmittal; International Search Report; and Written Opinion of the International Searching Authority for International Application No. PCT/US2012/055729 wit a mailing date of May 24, 2013.

* cited by examiner

RAIL RECOVERY SYSTEM FOR AIRCRAFT

CROSS-REFERENCE TO RELATED APPLICATIONS

This application claims priority to U.S. Provisional Patent Application No. 61/541,429, filed on Sep. 30, 2011, entitled "Rail Recovery System For Aircraft," by Jay Gundlach et al., which is hereby incorporated by reference.

TECHNICAL FIELD

The present invention relates to systems and methods for use with Unmanned Aerial Vehicles ("UAVs") and Unmanned Aerial Systems ("UASs"). More specifically, the present invention relates to systems and methods for enabling the operation of UAVs and UASs from small vessels or from ground sites with minimal footprints.

BACKGROUND INFORMATION

As is well known in the art, fixed-wing aircraft typically require a runway to take off and land. And a runway requires a large surface area, be it man-made (e.g., asphalt, concrete, or a mixture of both) or natural (e.g., grass, dirt, gravel, ice, or salt). Unfortunately, because of land limitations or other space constrictions, not all situations facilitate runway usage. Therefore, rotorcraft and many smaller UASs are advantageous because they do not require a traditional runway. Moreover, runway independent UASs enable organic UAV deployment from locations where traditional runways may not be feasible, including, for example, ships, trucks, forward operating bases, clandestine locales, payload emplacements, and transitory emplacements.

Runway independence also offers greater flexibility and security than traditional aircraft. However, current runway independent UASs consist only of small-fixed wing platforms, which often weigh less than 135 lbs, and Vertical Take-Off and Landing ("VTOL") platforms, such as helicopters, lift-fan aircraft, and so on. VTOL platforms, while effective, often lack endurance because they need large, inefficient power plants to take off and land. VTOL platforms generally include rotorcraft (e.g., a helicopter), although other kinds of systems using lift fans and jet engines are also practical. Despite the advances in VTOL technology, fixed-wing UASs typically offer greater performance than VTOLs, but they are not inherently runway independent. Therefore, specialized launch and recovery systems are needed to operate fixed-wing UASs without runways.

Historically, the launch system has been the lesser challenge for fixed-wing, runway-independent systems. Rail launchers, for example, have been used for ship-based floatplanes since before World War II, and they remain a low-risk method for modern UASs. Recovery, on the other hand, has traditionally been more difficult because of the challenges posed by, for example, precision engagement, energy absorption, and post-capture handling. Furthermore, fixed-wing recovery systems such as nets and vertical cables are typically only practical on small UAVs and UASs.

Known recovery approaches include nets, the Insitu SkyHook™, deep-stall/belly landing, nets, and low-speed parafoil recovery. Each of these legacy recovery approaches, however, has limitations for UASs having UAVs that weigh more than a few hundred pounds. These limitations may be attributed to, for example, unpredictable dynamic loads, poor precision, airframe-recovery system physical interface challenges, or excessive shock.

An example of a runway-independent technique for landing a smaller, fixed-wing UAV is to use a net to catch the UAS while in flight. For example, during the 1980s-1990s, battleships used the RQ-2 Pioneer, an early UAS employed in spotting for guns. In operation, the RQ-2 Pioneer could be launched from the fantail using a rocket-assist booster that would be discarded shortly after takeoff. Like modern UAVs, the Pioneer carried a video camera in a pod under the belly of the aircraft and transmitted live video to the ship's operators. To land the UAV, a net was deployed aft of the ship, and the aircraft was flown into the net. Though partially effective, using a net to catch a UAV in flight often resulted in damage to the airframe and a high loss rate. Similarly, positioning a net astern of the ship would increase the likelihood of loss if the aircraft missed the net and hit the ship instead.

The Insitu SkyHook™ allows runway-independent recovery of miniature robotic aircraft with a small operations footprint. The Insitu SkyHook™ uses a single cable hanging vertically from a boom to catch the aircraft on a wingtip hook. On land, the Insitu SkyHook™ may be used in wind conditions that would typically ground other aircraft. Though effective for miniature robotic aircraft, its method of hooking a wingtip and securing the air vehicle at a single point after capture, make the SkyHook™ ineffective for larger UAVs.

Accordingly, there is a need for systems and methods for improving recovery systems for fixed-wing, runway-independent systems. More specifically, there is a need for systems and methods for improving recovery systems for fixed-wing, runway independent systems for use with larger aircraft.

SUMMARY

The present disclosure endeavors to provide a system, method and apparatus that allow large UASs to operate from small vessels or from ground sites while occupying a minimal footprint.

According to a first aspect of the present invention, an aerial vehicle recovery system comprises an articulating crane; a rail positioned at a distal end of said articulating crane; a shuttle slideably coupled with said rail, wherein the shuttle comprises a set of two stanchions and wherein the shuttle is coupled with said articulating crane via a shuttle cable; and a capture cable stretched horizontally across each said set of two stanchions, wherein said capture cable is coupled to a shock-absorbing device.

According to a second aspect of the present invention, an aerial vehicle recovery apparatus comprises a rail; a shuttle slideably coupled with said rail, wherein the shuttle comprises a set of two stanchions and is coupled with said rail via a shuttle cable; and a capture cable stretched across said set of two stanchions, wherein said capture cable is coupled to a shock-absorbing device.

In certain aspects, the top hook assembly may act as a spring-damper for capture loads.

In certain aspects, the articulating crane may comprise a rotating base.

In certain aspects, the capture cable may be stretched horizontally across said set of two stanchions.

In certain aspects, the shuttle may further comprise a second set of two stanchions having a second capture cable stretched horizontally therebetween. The second capture cable may be configured to engage a hook positioned on a front end of an aerial vehicle.

In certain aspects, the hook positioned on the front end of the aerial vehicle may be engaged through upward angular momentum generated from the initial deceleration.

In certain aspects, the second capture cable may be used to reduce post-capture motion.

In certain aspects, the forces and moments imparted by the aerial vehicle may be transferred to the articulating crane.

In certain aspects, the rail may be folded to facilitate stowage.

According to a third aspect of the present invention, an aerial vehicle comprises a fixed-wing; a fuselage; a propulsion device; a hook assembly, the hook assembly comprising a hook portion, and a retractable-arm portion (optionally fixed position), wherein the retractable arm portion is hingedly coupled to said fuselage; and an extension mechanism configured to extend and retract the retractable-arm portion.

In certain aspects, the retractable arm may be coupled to the fuselage via a central bulkhead.

In certain aspects, the central bulkhead may serve as a wing carry-through structure.

In certain aspects, the hook assembly may be positioned aft of the aerial vehicle's center of mass.

In certain aspects, the hook assembly's hook portion and retractable-arm portion may a single element of a fixed length.

In certain aspects, the hook assembly's retractable-arm portion may be formed from multiple elements and configured to fold. In certain other aspects, the hook assembly's retractable-arm portion may be telescopic. In certain aspects, the hook assembly may contain a cable that reacts capture forces in tension.

BRIEF DESCRIPTION OF THE DRAWINGS

These and other advantages of the present invention will be readily understood with reference to the following specifications and attached drawings, wherein.

DETAILED DESCRIPTION

Figure 1A:
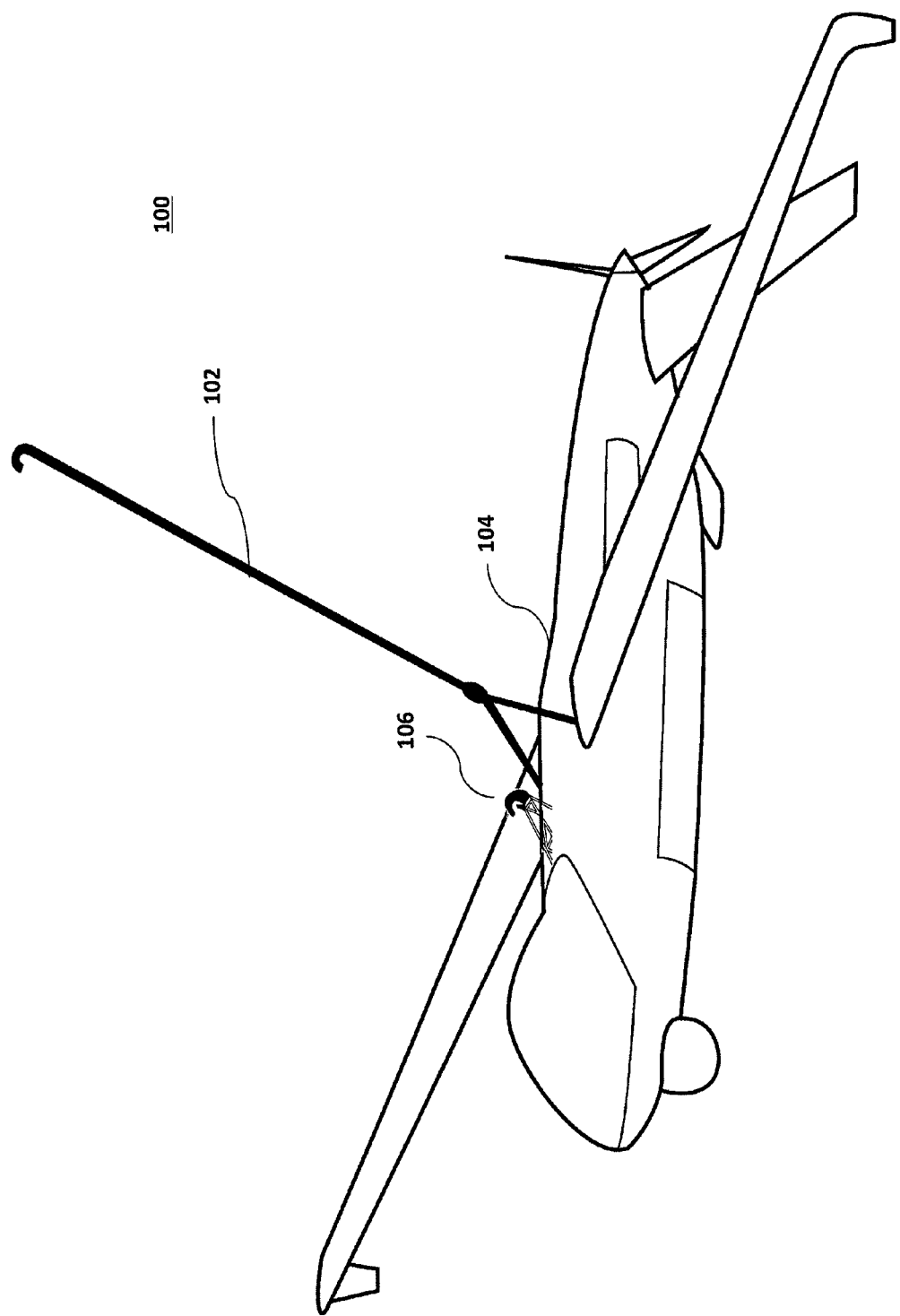
FIGS. 1a through 1f illustrate an aerial vehicle equipped with a retractable top-hook assembly that is configured for use with, for example, a side-arm recovery system.

Embodiments of the present invention are described hereinbelow with reference to the accompanying drawings. In the following description, well-known functions or constructions are not described in detail because they would obscure the invention in unnecessary detail.

Because of continuing advancements in UAS and UAV technology, the use of UAVs has continued to grow. For example, the Aurora Perseus-N design offers excellent mission performance and, when in the stowed position, occupies only 64×470 inches of hangar space—roughly half the footprint of an MH-60 helicopter. Although UAVs such as the Perseus-N offer excellent mission performance in the air, when runways are unavailable, suitable mechanisms should be provided to facilitate launch and recovery. Therefore, as discussed below, UASs such as the Perseus-N may be configured to utilize a top-hook assembly with a side-arm recovery system to facilitate effective launch and recovery.

As discussed in greater detail below, a side-arm recovery system could be configured to facilitate the safe, all-weather recovery of fixed-winged aircraft from small vessels and/or from ground sites while occupying a minimal footprint. In certain aspects, the side-arm recovery system may be further configured to enable the safe, all-weather launch of fixed-winged aircraft.

FIGS. 1a through 1f illustrate an aerial vehicle 100 equipped with a retractable top-hook assembly 102 that is configured for use with, for example, a side-arm recovery system. The top-hook assembly 102, which generally comprises an arm portion 102a, a hook portion 102b, and an extension mechanism coupled with a hinge apparatus, may be mounted on the airframe (e.g., the fuselage 104) of an aerial vehicle. The extension mechanism may be used to extend and retract the top-hook assembly 102. The primary hook assembly may be extended via hydraulic, pneumatic, electro-mechanical, or mechanical spring actuation. The position of the top-hook assembly 102 with respect to the aerial vehicle 100 center of mass can affect the moments imparted on the aerial vehicle 100. More particularly, the aerial vehicle's 100 pitch attitude can be limited by appropriately setting the top hook assembly 102. Thus, the top-hook assembly 102 may be positioned aft of the aerial vehicle's 100 center of mass. During capture, the hook/hook arm may be used to catch the horizontal cable. The arm can rotate/flex backwards or the aircraft can pitch up upon contact with the cable such that the cable translates along the arm until it reaches the hook. The hook may contain a securing mechanism to ensure that the cable does not exit the hook during capture. For example, the securing mechanism may be a latch device that closes off the hook's throat opening once the cable has been captured, thereby reducing the risk of the cable prematurely exiting the hook's throat opening.

Figure 1B:
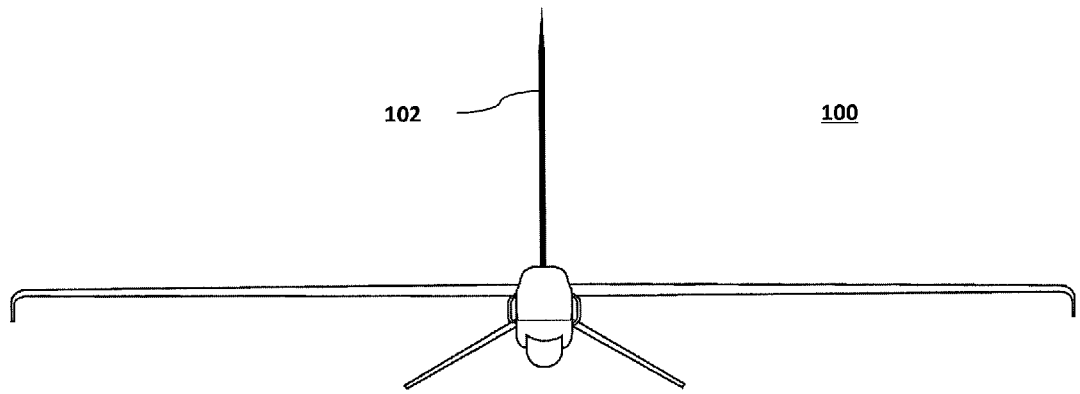
Figure 1C:
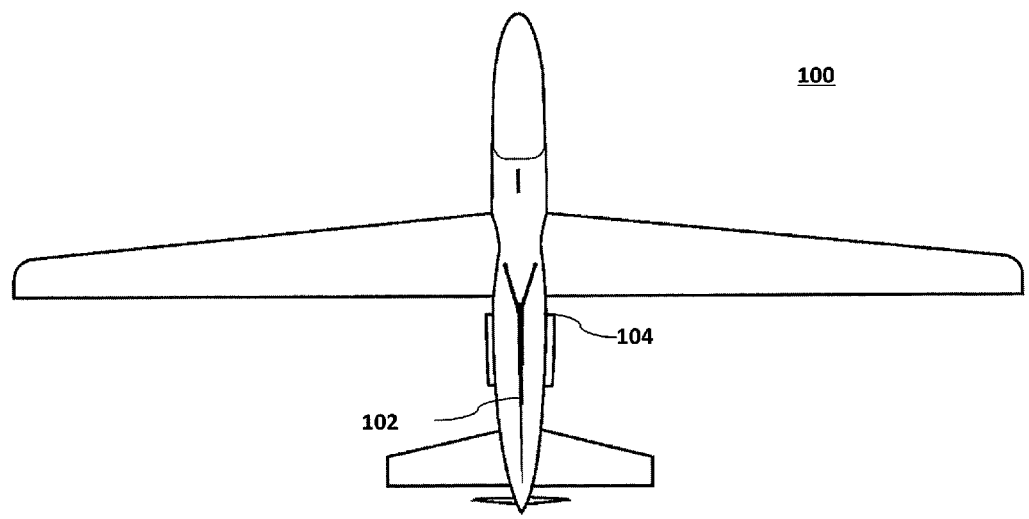
Figure 1D:
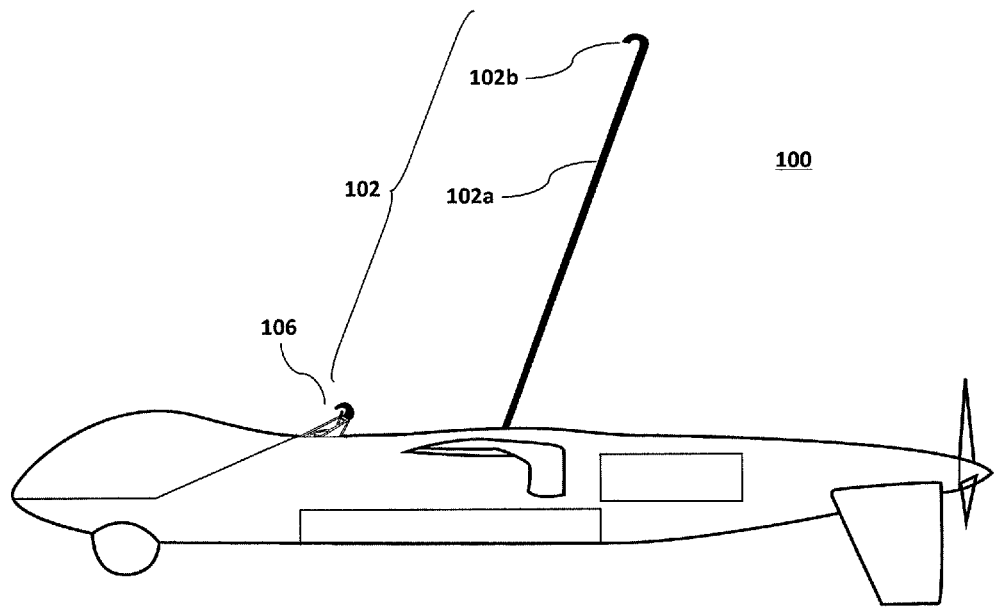
Figure 1E:
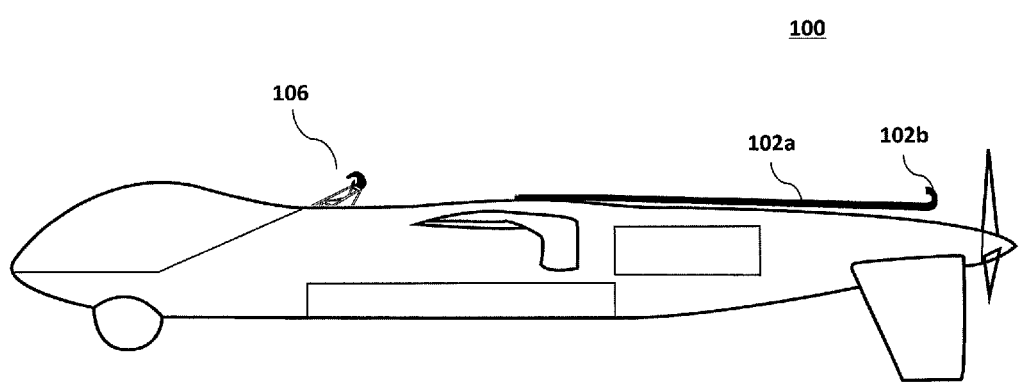

The top-hook assembly 102 may be located on the top side of a UAV's 100 fuselage 104 and, as illustrated in FIGS. 1c and 1e, may be retracted using the extension mechanism to facilitate low cruise drag. FIGS. 1b and 1d illustrate front and side views of the aerial vehicle 100 with the top-hook assembly 102 in the extended position, while FIGS. 1c and 1e illustrate top and side views the aerial vehicle 100 with the top-hook assembly 102 in the retracted position. In the retracted position, the arm portion 102a and the hook portion 102b may be configured to lay on the top of, or substantially parallel to, the fuselage 104. To further reduce drag, the arm portion 102a and the hook portion 102b may be configured to reside or fit within a recessed compartment within the fuselage 104. Accordingly, in operation, the top-hook assembly may be retracted and stored along the fuselage during cruise and be extended during approach. Rotation of the top-hook assembly 102 may be limited by, for example, a parallel spring and damper.

In operation, the extension mechanism may also act as a spring-damper for capture loads. For example, the extension mechanism may be used to provide a reaction (i.e. compression force or torque moment) upon the arm during engagement with the wire. Accordingly, the reaction may be used to counter the forces and moments exerted on the arm during engagement, which may cause the arm to rotate backward. Configuring the extension mechanism to counter the capture forces and moments would assist in damping and absorbing loads during capture. The hook assembly may be retractable in flight or left extended after activation. For in-flight retractable configurations, the hook may be retracted via hydraulic, pneumatic, electro-mechanical, or passive inertial or aerodynamic means.

Figure 1F:
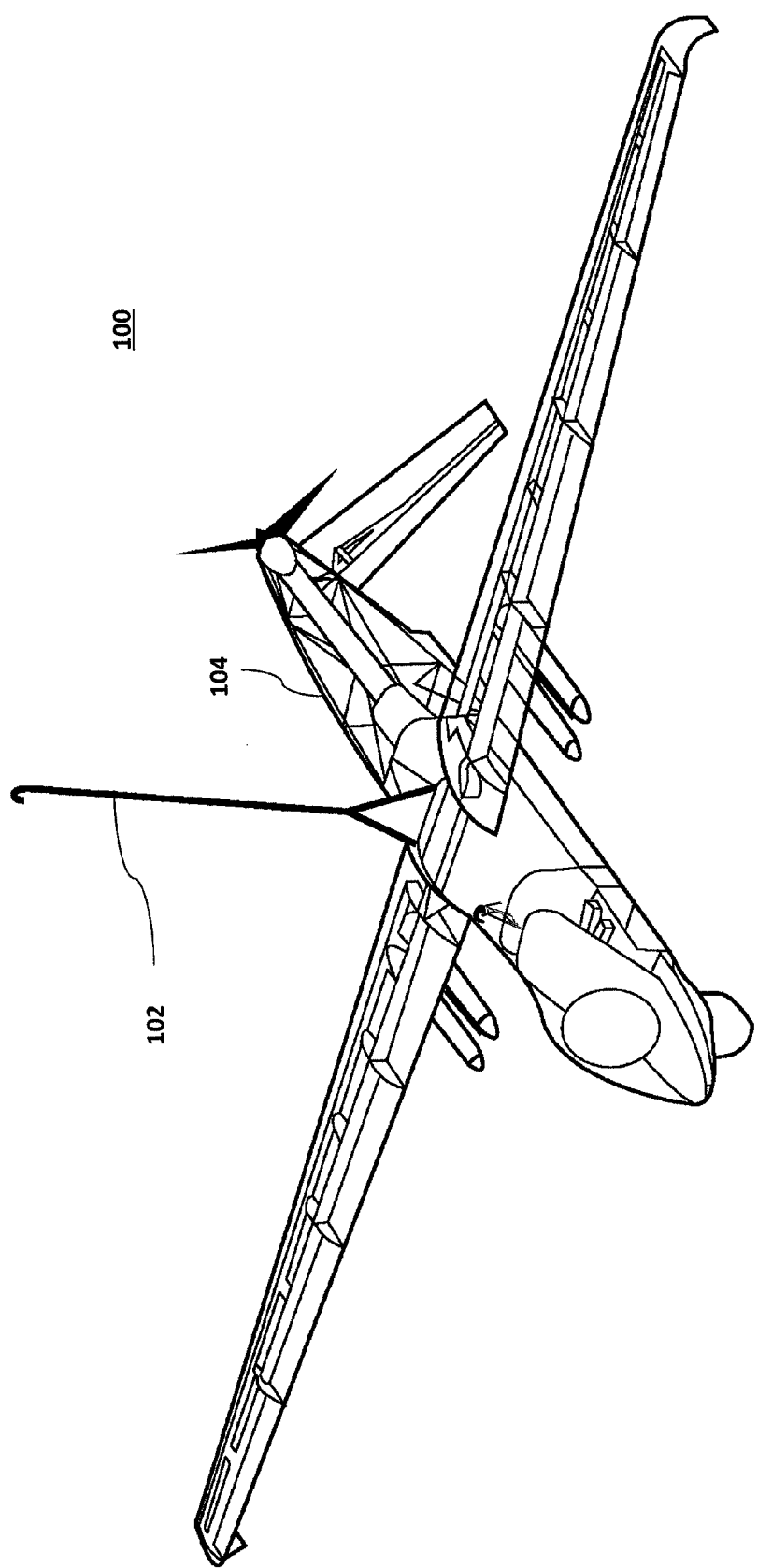

As illustrated in FIG. 1f, the top-hook assembly 102 may be attached to or integrated with the aerial vehicle's airframe, such as a structural member in the central fuselage. Moreover, to save weight, the structural member, coupled with the top-hook assembly 102, may be configured to perform multiple functions, where the non-capture loads of the multi-function structural members may not be at their peak values at capture. The structural member coupled to the top-hook assembly 102 may also serve as, for example, a wing carry-through spar, fuel tank bulkhead, pressure bulkhead, manufacturing break bulkhead, module break bulkhead, firewall, ground handling interface, or longitudinal member such as a keel. The structural member used with the top-hook assembly 102 may be generally similar to structural members derived from the lower tail hooks of carrier-based aircraft.

The structural member and/or top-hook assembly 102 may provide interface points built into the fuselage 104 to facilitate the hoisting of the aerial vehicle 100 during loading and unloading operations from shore cranes, or to secure the aerial vehicle as a sling load under a helicopter. In certain aspects, the aerial vehicle 100 may be further configured with a small secondary fuselage hook 106 for capturing a forward wire positioned on the shuttle of a side-arm recovery system. The forward wire may be used to reduce or eliminate post-capture motion and to assist in deck handling. The secondary fuselage hook 106 may be positioned toward the front of the UAV 100. The position of the secondary hook 106 may be located based on positive capture of the secondary cable. Like the top hook 102, the optional secondary fuselage hook 106 may be similarly retracted to reduce drag. The secondary fuselage hook 106 contains a positive latching device to ensure that the cable will not exit the hook during capture. Like the primary fuselage hook, the secondary fuselage hook may contain a securing mechanism to ensure that the cable does not exit the hook during capture. For example, the securing mechanism may be a latch device that closes off the hook's throat opening once the cable has been captured, thereby reducing the risk of the cable prematurely exiting the hook's throat opening.

Though a retractable single segment top-hook assembly is depicted in FIGS. 1a-1f, the top-hook assembly may be a folding multi-segment (e.g., multiple segments hingedly coupled end-to-end), telescoping, inflatable, employ a kite, and/or non-retractable. In situations in which the top-hook assembly is non-retractable, the top-hook assembly need not include an extension mechanism coupled with a hinge apparatus.

In operation, the top-hook assembly 102, whether or not retractable, may be configured to engage a side-arm recovery system by snagging a cable affixed to, for example, a shuttle. As discussed in greater detail below, to absorb energy, the shuttle may be slideably coupled with a rail using known techniques and positioned at the end of a crane boom. Techniques for slideably coupling the shuttle with the rail may include, for example, one or more tracks, wheels, ball bearings, chains, etc. The rail may be adjusted in yaw to align with the wind.

In operation, the arresting forces may predictably act approximately in the plane of symmetry through the central structure. Moreover, in shipboard operation, the aerial vehicle's 100 momentum is preferably not directed at the ship's structure, thereby minimizing the risk of ship collision. Rather, the aerial vehicle's 100 momentum could be directed over the water and, for example, parallel or adjacent to the ship's structure. However, directing the aerial vehicle 100 at the ship's structure may be necessary depending on wind direction.

Although the aerial vehicle of FIGS. 1a-1g generally illustrate a fixed-wing, pusher-propeller aircraft (e.g., the Perseus-N, developed by the Aurora Flight Sciences), the present application is not limited to any particular aerial vehicle. In fact, as depicted in FIGS. 2a through 2f, a top-hook assembly may be coupled with a wide variety of aerial vehicles and may be applied to aerial vehicles having virtually any propulsion device, including, but not limited to, propellers, jet engines, lift-fans, and so on. Accordingly, a number of general hook-airframe configurations are contemplated for use with a top-hook assembly and side-arm recovery system.

Figure 2A:
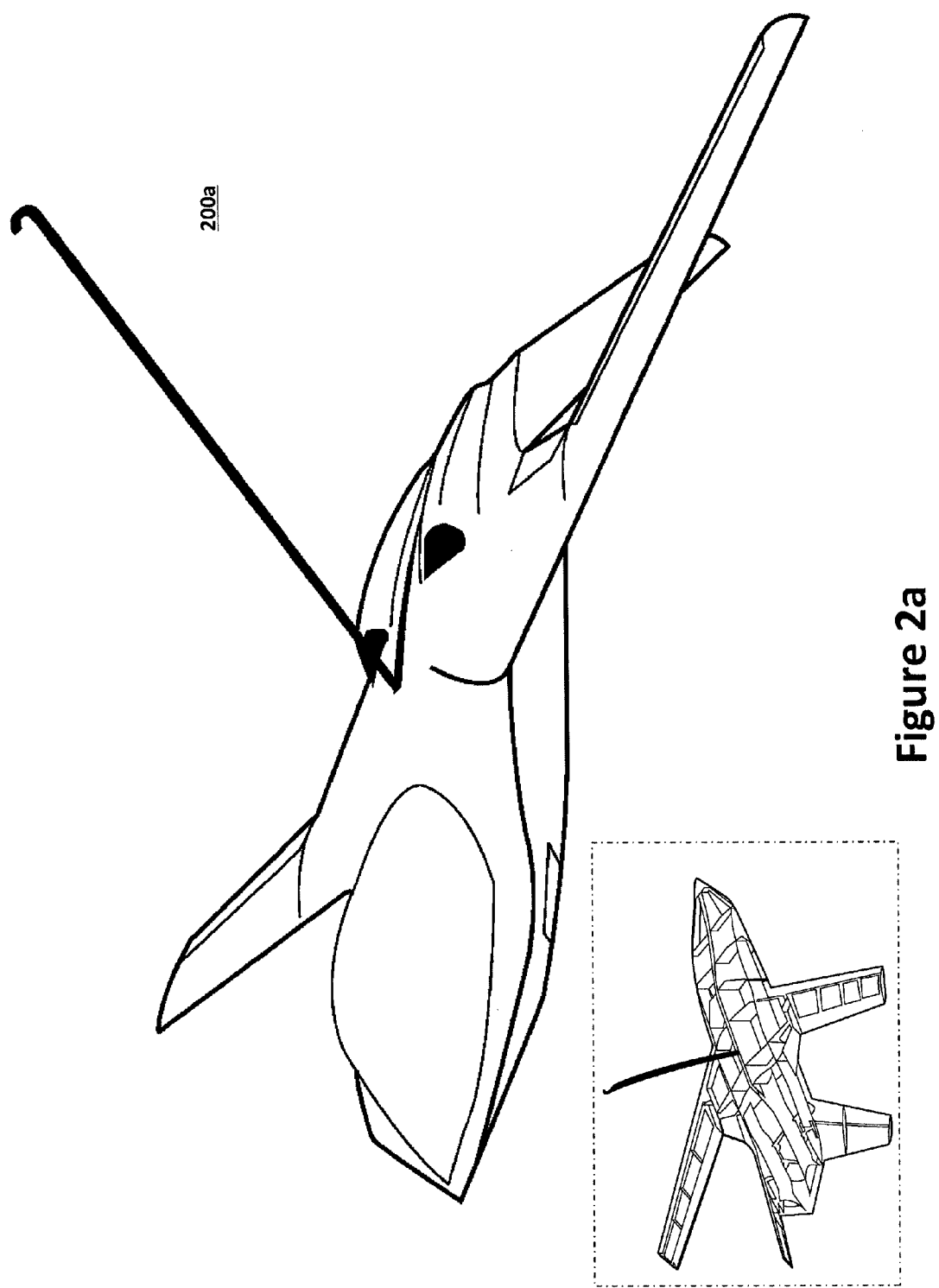
FIGS. 2a through 2g illustrate an additional aerial vehicles equipped with a retractable top-hook assembly that is configured for use with, for example, a side-arm recovery system.

FIG. 2a illustrates a jet-powered aerial vehicle 200a equipped with a top-hook assembly wherein the hook and arm are configured to retract between the aerial vehicle's 200a jet engines. As illustrated, the arm may be a one-piece unit that extends from the forward fuselage to the tail. As illustrated in the inset cut-away view of aerial vehicle 200a, the top-hook assembly may be attached to or integrated with a structural member in the central fuselage as it is in the aerial vehicle 100 of FIG. 1f.

Figure 2B:
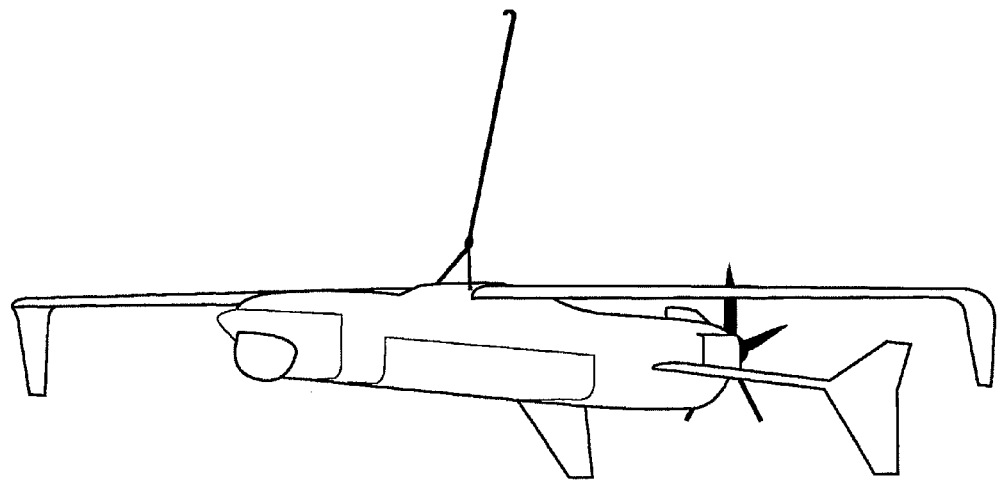

FIG. 2b illustrates a pusher-propeller aerial vehicle 200b wherein the hook and arm are configured to lay on top of, or substantially parallel to, the fuselage when retracted. Because pusher-propeller aerial vehicles are configured with propellers toward the tail of the aircraft, it is important that the hook and arm do not interfere with the path of the propeller. For example, the length of the arm may be designed such that it terminates just before the propeller when retracted. Alternatively, the arm may be configured to telescope, fold, and/or bend so that it does not interfere with the propeller when retracted. In yet another alternative, the arm may be bent or otherwise formed such that the arm does not lie in the path of the spinning propeller when retracted.

Figure 2C:
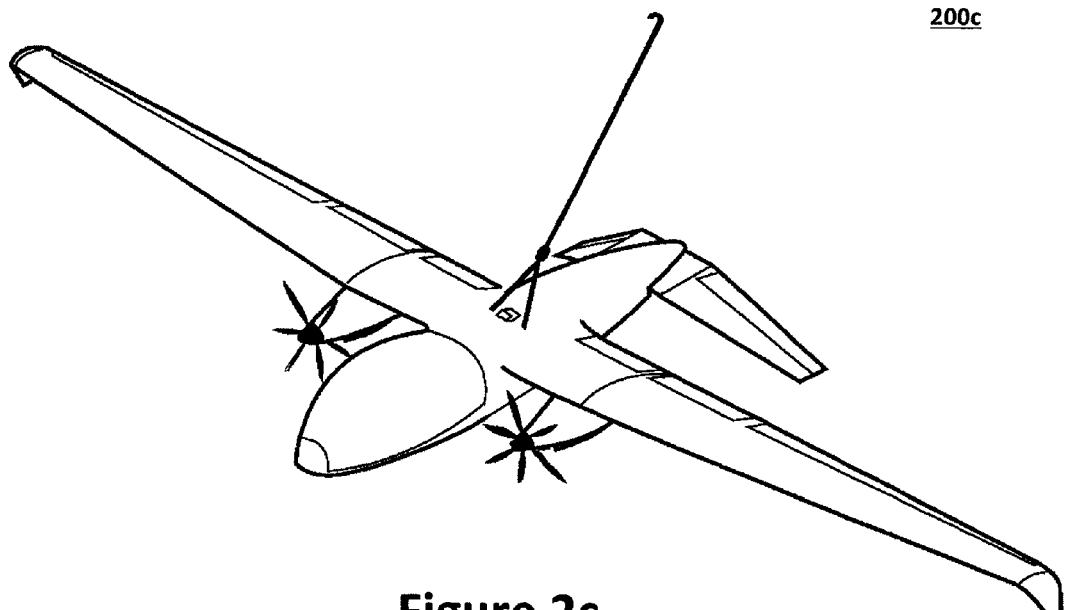

FIG. 2c illustrates a tractor propeller aerial vehicle 200c wherein the hook and arm are configured to lay on the top of, or substantially parallel to, the fuselage when retracted. More specifically, twin wing-mounted engines are located on each side of the fuselage and a top-hook assembly is located on the upper fuselage. As with other tractor-type aerial vehicles, a single element top-hook assembly may be used without fear of propeller interference because there is no obstruction from a rear propeller. However, it remains entirely possible to employ a telescoping, folding and/or bending arm.

Figure 2E:
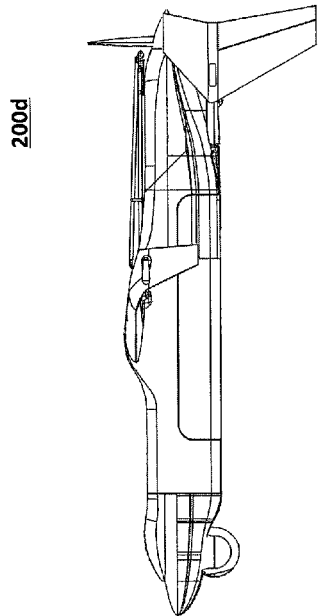
Figure 2G:
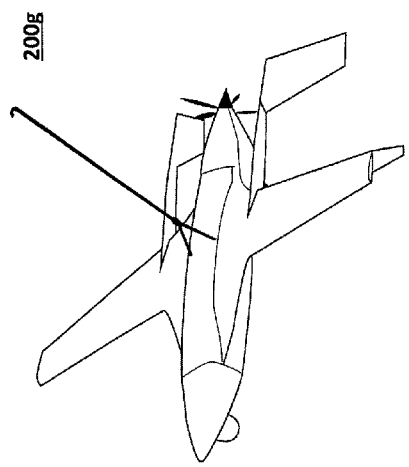
Figure 2D:
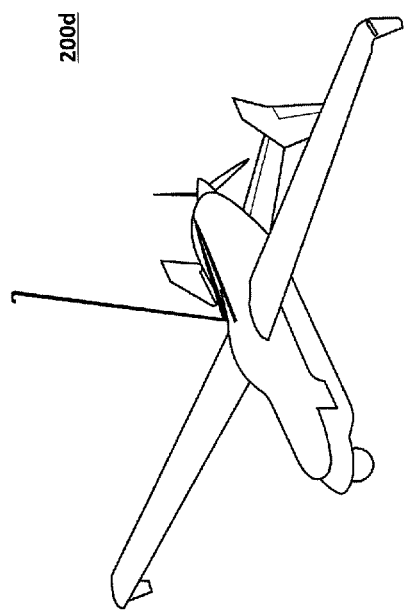

FIGS. 2d and 2e illustrate views of a pusher-propeller aerial vehicle 200d wherein the top hook's arm is segmented (e.g., multi-segments) and is configured to fold when in the retracted position. Folding the top hook's arm may be advantageous when the length of the arm is greater than the length of the fuselage portion behind the point where the top-hook assembly is connected to the fuselage. As illustrated in the side view of FIG. 2e, by folding the top-hook assembly's arm, the arm will not extend into and/or interfere with the propeller, which is positioned at the rear of the fuselage in a pusher configuration. Alternatively, the arm may be configured to telescope so that it does not interfere with the propeller when retracted. In yet another alternative, the arm may be bent or otherwise formed such that the arm does not lie in the path of the spinning propeller when retracted.

Figure 2F:
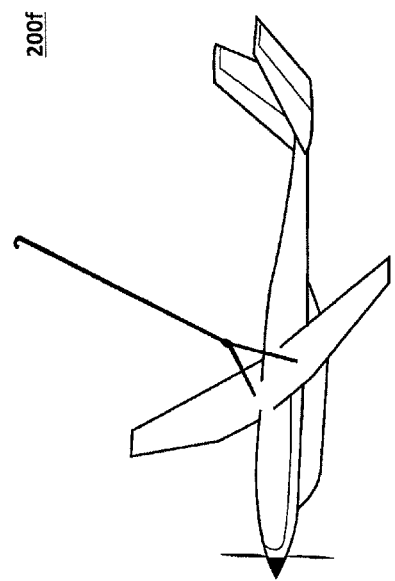

FIG. 2f illustrates a tractor-propeller aerial vehicle 200f wherein the hook and arm are configured to lay on the top of the fuselage when retracted. More specifically, as with other tractor-type aerial vehicles, a single element top-hook assembly may be used without fear of propeller interference because there is no obstruction from a rear propeller. However, it remains entirely possible to employ a telescoping, folding and/or bending arm.

FIG. 2g illustrates a pusher-propeller aerial vehicle 200g wherein the top hook's arm is segmented and is configured to fold when in the retracted position to avoid interference with the propeller. Alternatively, the arm may be configured to telescope so that it does not interfere with the propeller when retracted. In yet another alternative, the arm may be bent or otherwise formed such that the arm does not lie in the path of the spinning propeller when retracted.

While a top-hook assembly is used throughout the application, a lower hook assembly may also be employed. In operation, an aerial vehicle equipped with a lower hook assembly may be rolled to an inverted position during approach to enable capture. Moreover, a non-retractable hook assembly may be used, eliminating the need for an extension mechanism coupled with a hinge apparatus. Alternatively, the hook assembly may be rotated to the side of the aircraft and integrated with the wing when retracted. In yet another alternative, the hook may be positioned above the propeller's arc, thereby permitting the use of a stand-alone hook or a hook on top of an arm or other boom-like structure. Another suitable hook assembly may use a single-upper-element hook with inlets located on the side (one side or both sides) or bottom of fuselage.

Figure 3A:
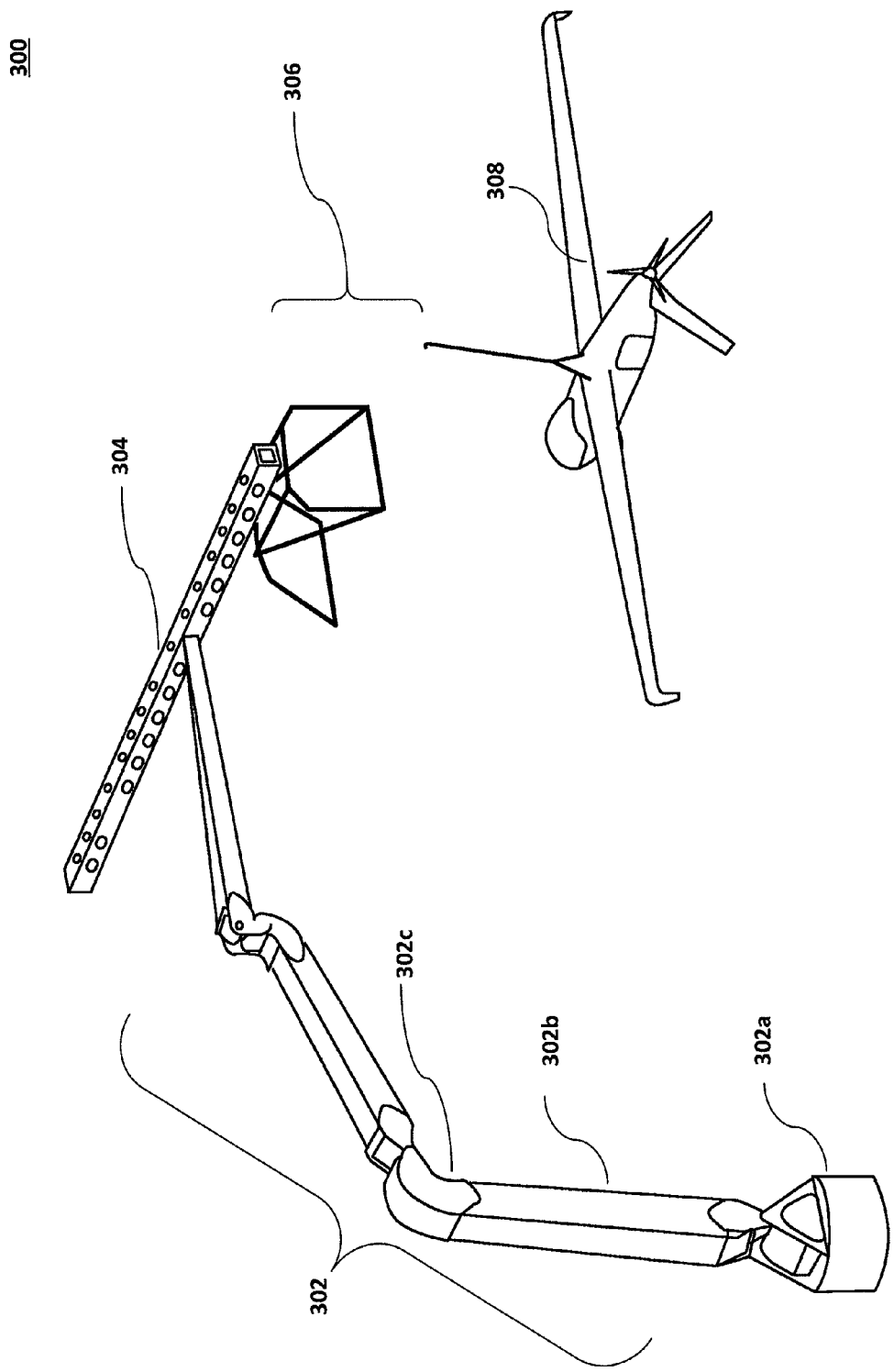
FIG. 3a illustrates a side-arm recovery system.

FIG. 3a illustrates a side-arm recovery system 300. The side-arm recovery system 300 of FIG. 3a generally comprises a crane 302, a rail 304, and a translating shuttle 306. The side-arm recovery system 300 may be installed on a plurality of surfaces, including for example, the ground, a ship, a land-based vehicle, and/or a land structure, such as a building. However, for purposes of this application, the side-arm recovery system 300 will be generally described in shipboard operations. In use, the rail 304 may be adjusted in yaw to align with the wind.

In certain aspects, the side-arm recovery system 300 may be semi-permanently installed. Thus, the side-arm recovery system 300 may be relocated and/or removed from the ship and/or ground between deployments. As illustrated in FIG. 3a, a rail 304 may be coupled to the end of a fully articulated (e.g., adjustable) crane 302. To facilitate folding for stowage, the rail 304 may comprise one or more hinges. The rail may be constructed of high strength metal or composite materials. In certain aspects, the rail may be hinged to enable low-footprint storage.

The crane 302 and the aerial vehicle 308 are preferably sized, or otherwise configured, to facilitate recovery of an aerial vehicle 308 at the maximum takeoff weight (e.g., with a full payload). The crane 302 and rail 304 components may comprise, or be constructed from, for example, Weldox 1300 high-strength steel. Weldox 1300 high-strength steel is qualified for marine use and is found in many marine cranes. However, other materials may be employed depending on the application and/or as desired by the designer or fabricator. A translating shuttle 306 is mounted to slide on or otherwise slideably coupled with the rail 304 and may be used to assist in capturing and absorbing energy during aerial vehicle capture.

As illustrated in FIGS. 3a-3g, the side-arm system may be designed to occupy a small footprint and may be configured, or scaled, to fit a predetermined area as required by location where the side-arm system is installed—the footprint being generally defined by, for example, the size and shape of the base 302a. A small footprint facilitates integration or coupling with vehicles and applications where space is somewhat limited, such as, for example, a ship's deck, remote/congested structures, and/or ground sites with a minimal footprint. Moreover, to reduce unwanted crane 302 movement (e.g., swaying) and increase stability, the base 302a may be secured or otherwise anchored to a surface using one or more anchoring techniques, such as, for example, bolts or welding. While the base 302a illustrated in the various figures has a smaller footprint, a larger base may be employed to increase the size of the footprint, thereby increasing stability of the side-arm system. A larger base may be advantageous when a base 302a cannot be readily anchored or secured to the ground. For example, securing a base 302a to a relatively unstable surface (e.g., soft dirt or sand) can be difficult, thus, it may be advantageous to increase the surface area, thereby providing a platform, to reduce and/or eliminate reliance on the one or more anchoring techniques.

When not in operation, the recovery system 300 can be conveniently collapsed (i.e., stowed) and/or removed to facilitate, for example, other deck operations and to accommodate other aircraft. To facilitate movement, the crane 302 may comprise a pivotable base 302a, and two or more boom sections 302b coupled end to end using a boom hinge 302c to form an arm. The pivotable base 302a may be used to rotate the crane 302 about an axis. For example, the pivotable base 302a may be configured to rotate 180 degrees in each direction, thereby providing a total of 360 degrees of rotation. The crane 302, which may be functionally akin to a loader crane (aka, a knuckle-boom crane or articulating crane), may be, for example, a fully articulated, hydraulically powered arm. The numerous jointed boom sections 302b may be folded into a small space when the crane 302 is not in use to facilitate stowage. One or more of the boom sections 302b may be telescopic, thus providing, for example, a greater reach. When hydraulics are employed, the recovery system 300 may employ one or more engines for operating the hydraulic pump that enables operation of the articulated boom.

In certain aspects, the crane 302 may have a degree of automation and be able to unload or stow itself without an operator's instruction. For example, a computer may be coupled with the crane 302 and used to initiate or transmit a self-stowing protocol upon command, thereby avoiding the need to manually guide the crane 302 into a stowed position. Similarly, the computer may be further configured to instruct the crane to assume a predetermined position (e.g., fully extended with the rail positioned over the water). The crane 302 may be fitted with a portable cabled or radio-linked control system to supplement the crane-mounted hydraulic control levers.

Figure 3B:
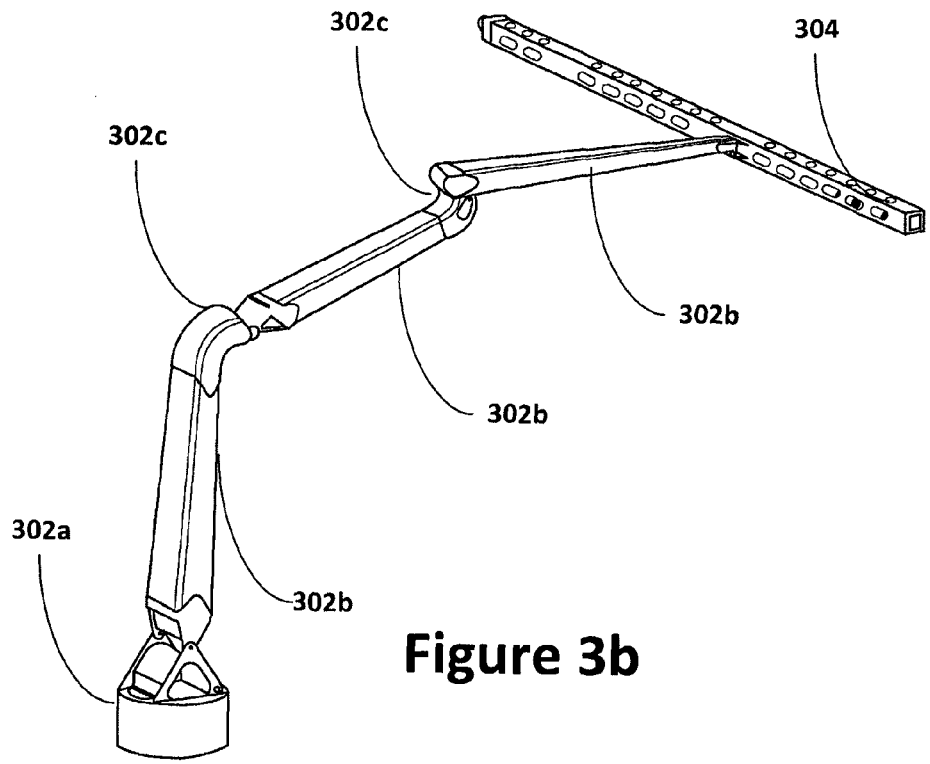
FIG. 3b illustrates an articulating crane having three boom sections and two boom hinges in the fully extended position with a rail positioned at the end of the crane.
Figure 3C:
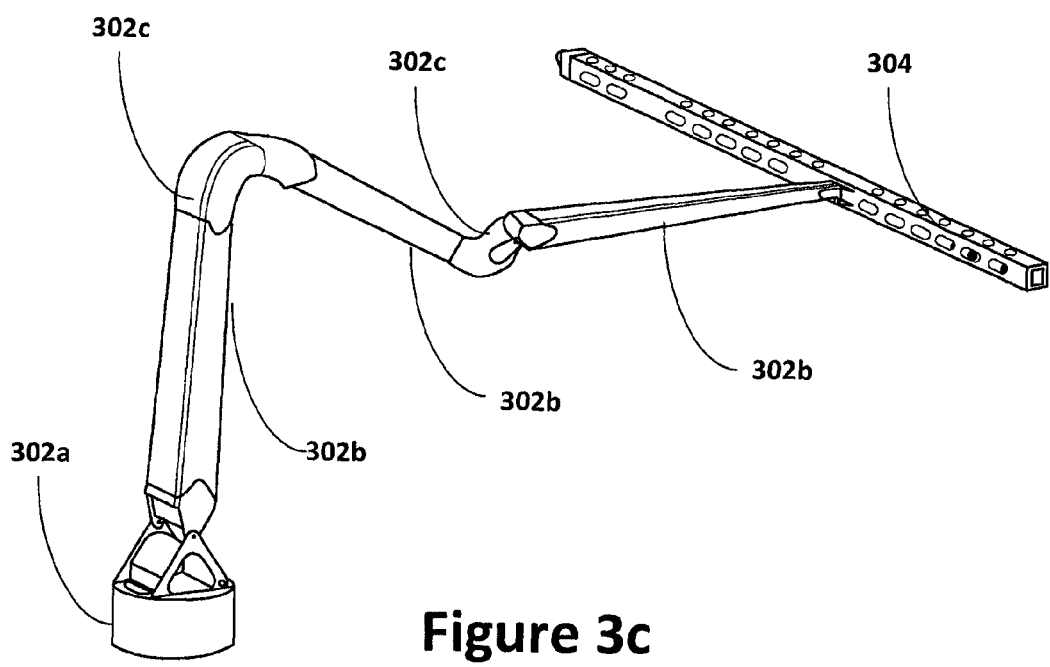
FIG. 3c illustrates the crane of FIG. 3b in the first phase of collapse.
Figure 3D:
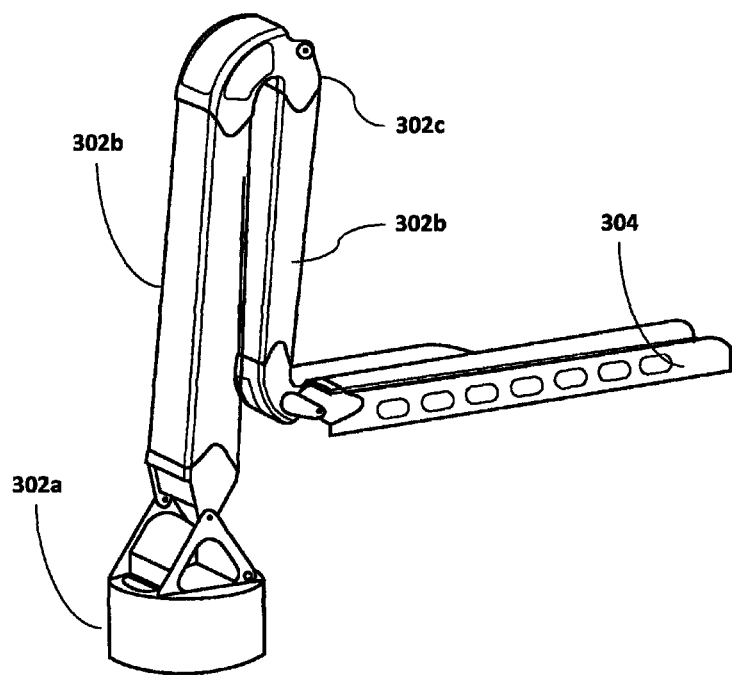
FIG. 3d illustrates the crane of FIG. 3b in the second phase of collapse.
Figure 3E:
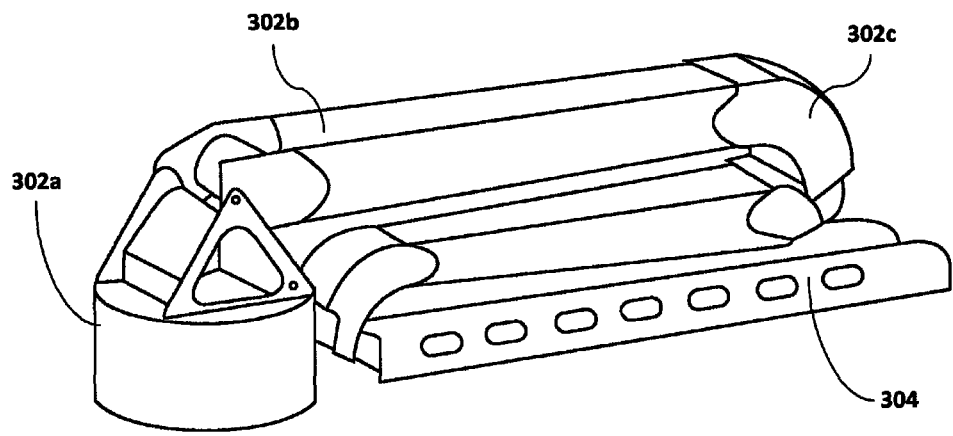
FIGS. 3e through 3g illustrate the crane of FIG. 3b in a stowed configuration.
Figure 3F:
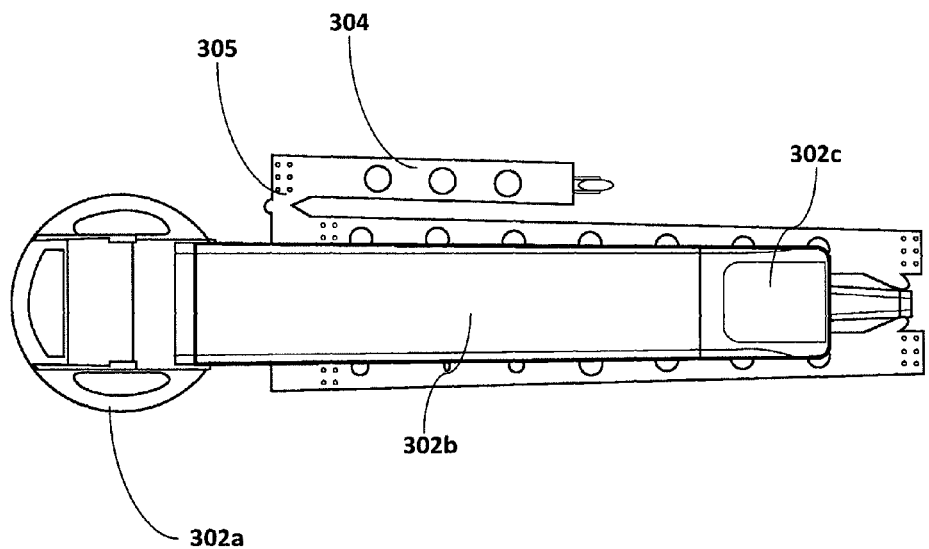
Figure 3G:
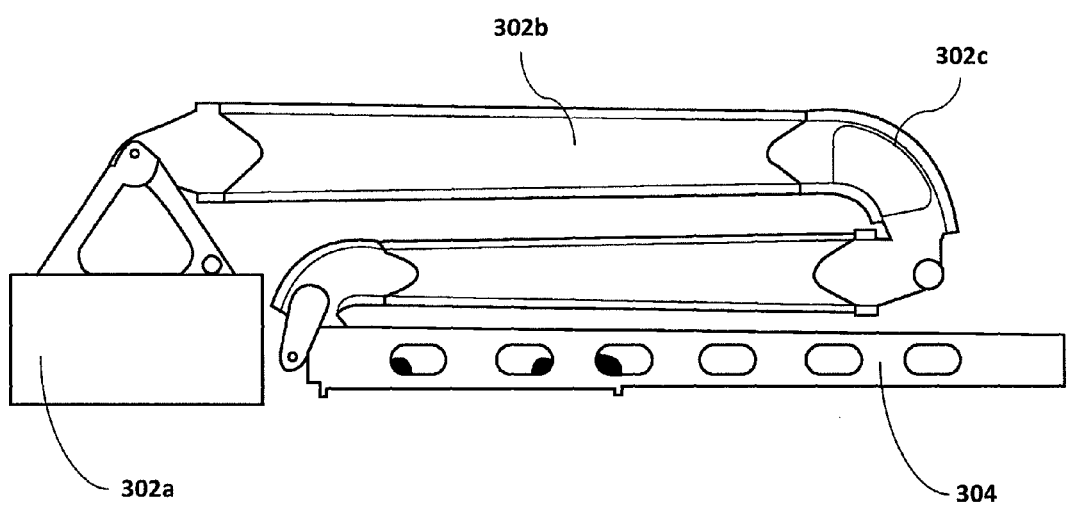

Thus, when not in use, the hydraulics and one or more boom hinges 302c may be used to collapse and stow the crane 302. For example, FIG. 3b illustrates an articulating crane 302 having three boom sections 302b and two boom hinges 302c in the fully extended position with a rail 304 positioned at the end of the crane 302. FIG. 3c illustrates the crane 302 in a first phase of collapse wherein the first and second boom hinges 302c have folded such that the rail 304, which is positioned at the end of the crane 302, is kept at substantially the same angle (e.g., substantially parallel to the ground), but where the distance between the rail 304 and the ground has been decreased. FIG. 3d illustrates the crane 302 in a second phase of collapse wherein the first and second boom hinges 302c have been further folded and the rail 304 has also been folded using one or more rail hinges 305. FIG. 3e illustrates the crane 302 in a third and final phase of collapse (i.e., stowed) wherein the first and second boom hinges 302c have been fully folded such that the boom sections 302b are substantially parallel to each other and the rail 304, which may still be folded, is positioned on or near the ground. FIG. 3f illustrates a top plan view of the fully folded crane 302 and rail 304 of FIG. 3e. FIG. 3g illustrates a side view of the fully folded crane 302 and rail 304 of FIG. 3e. In an instance where a computer is used to facilitate automation, the crane 302 may be configured to, upon command, automatically take the stowed position—illustrated in FIGS. 3e through 3g.

Figure 4A:
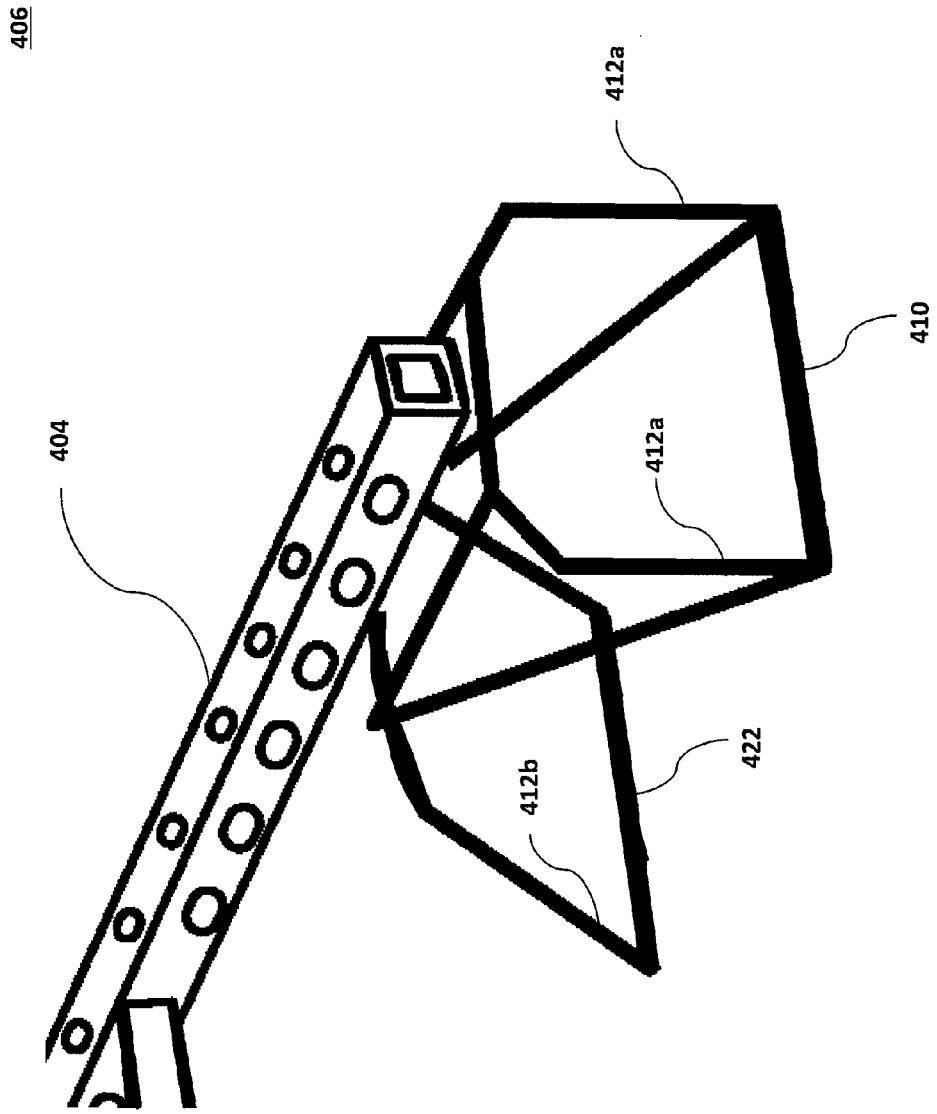
FIG. 4a illustrates a detailed view of a translating shuttle.
Figure 4B:
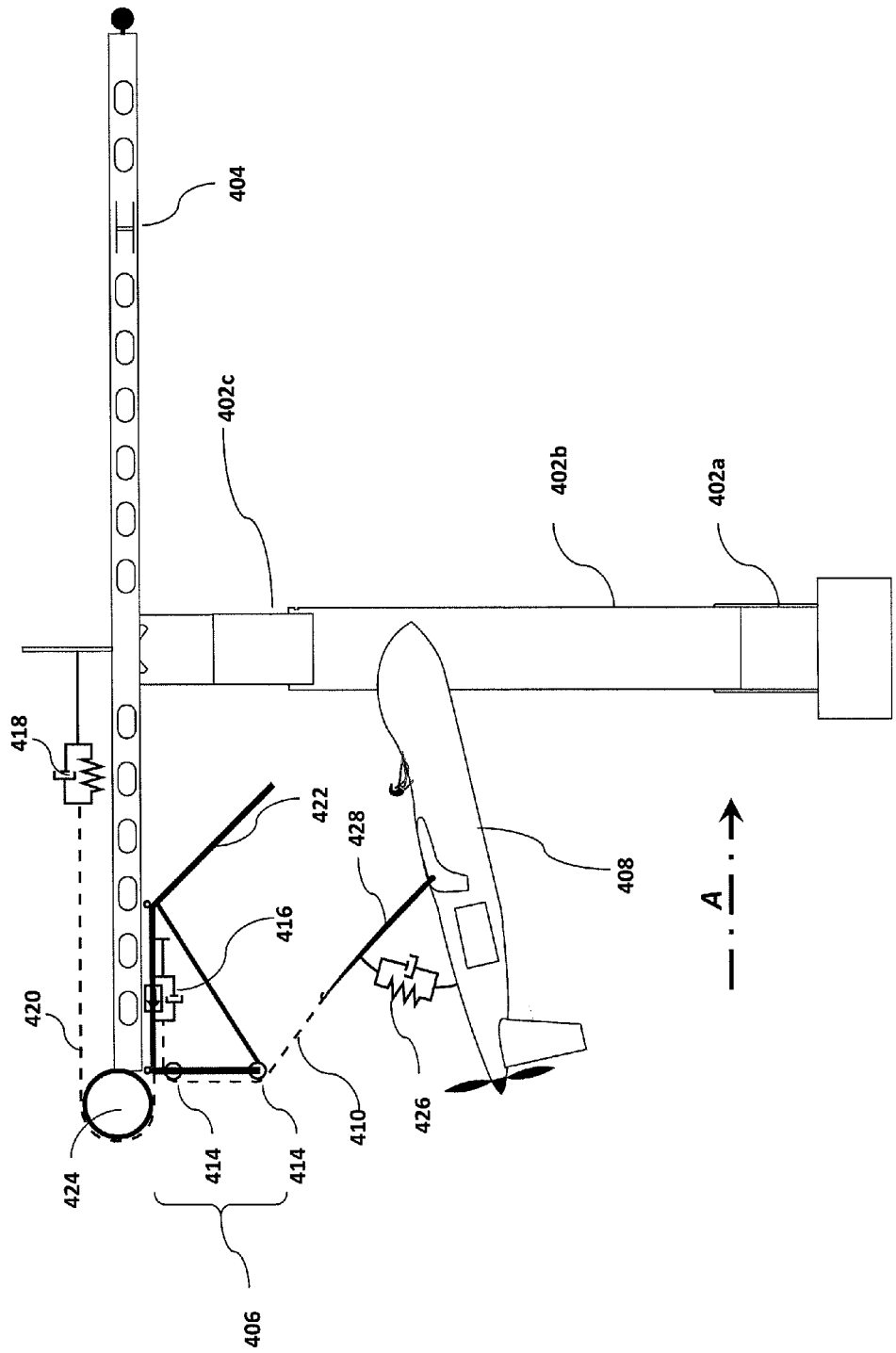
FIG. 4b illustrates a schematic view of the side-arm recovery system of FIGS. 3a-3g.

Turning now to FIGS. 4a and 4b, a detailed view of the translating shuttle 406 and a schematic of the side-arm recovery system 400 of FIGS. 3a-3g are shown. A first capture cable 410 may be stretched across two rear downward-pointing poles or stanchions 412a mounted on the translating shuttle 406 to act as a primary capture device. A second capture cable 422 may be stretched across two forward downward-pointing poles or stanchions 412b mounted on the translating shuttle 406 to act as a primary capture device. As illustrated, the first and second capture cables 410, 422 may each be configured such that they are substantially horizontal (e.g., horizontally stretched across the two stanchions). Accordingly, in operation, the first and second capture cables 410, 422 may be substantially perpendicular to the arm of the top-hook assembly positioned on the aerial vehicle 408.

The first and second capture cables 410, 422 may be constructed from, for example, wire cable or rope (i.e., a type of rope which consists of several strands of metal wire laid into a helix) or synthetic cable/rope. As illustrated in FIG. 4b, the capture cable 410 may be further threaded through one or more pulleys 414 and coupled to a first cable management device 416. The cable management device 416 may be configured to provide a constant cable tension augmented by a shock absorber to absorb energy. Example cable management devices 416 may include, for example, a winch coupled with one or more shock absorbers, water twisters, springs (linear or torsional), elastic cables, or hydraulics. The cables may be kept on the pulleys with cable guards.

To assist in energy absorption, the shuttle 406 may be slideably coupled to the rail 404. To provide or maintain tension during, for example, capture, one end of a shuttle cable 420 may be coupled to the shuttle 406 while the other end of the shuttle cable 420 may be further threaded through one or more pulleys 424 and coupled to a second cable management device 418. The shuttle cable 420 may be constructed from, for example, wire cable/rope or synthetic cable/rope. The cable management device 418 may be configured to provide a shuttle cable 420 tension augmented by a shock absorber. Moreover, the energy absorbing device 418 may be configured to reel in (or let out) the shuttle cable 420 thereby enabling the shuttle 406 to slide along the rail 404.

The capture cable 410 tension, cable management device 416, shuttle cable 420 tension, and shuttle cable management device 418 may be used to determine the maximum deceleration of the aerial vehicle 408 during capture. For example, a higher force and damping yields an increase in the deceleration of the shuttle 406 and the aerial vehicle 408. In turn, a lower force and damping will result in a decrease in the deceleration of the shuttle 406 and the aerial vehicle 408. Accordingly, a longer rail may be required with lower force and damping. The cable tension and shock absorber determine the deceleration of the aerial vehicle together with the cable 420 pay-out length which defines the arresting envelope.

In operation, the translating shuttle 406 travels along the rail 404 in the direction of the aerial vehicle's 408 path (i.e., direction A). During arresting (i.e., capture), the translating shuttle 406 may be entrained by the aerial vehicle 408 (e.g., via the top-hook assembly 428) through the capture cable 410. The top-hook assembly 428 may be extended and/or retracted via extension mechanism 426. The aerial vehicle's kinetic energy may be dissipated into the translating shuttle 406, which may then be dissipated into an absorbing device 418 via a shuttle cable 420 coupled to the crane's 402 structure. Thus, the capture loads are transmitted through the crane 402 and into a ship or the ground.

The translating shuttle 406 may further include a secondary capture device 422, such as a cable or net, which may be used to catch the nose of the aerial vehicle 408 during capture. In certain aspects, the secondary capture device 422 may be configured to couple with a secondary fuselage hook positioned toward the nose of the aerial vehicle 408. The secondary capture device 422 may be used to reduce or eliminate post-capture motion and to aid in deck handling. Accordingly, following the arrest, the aerial vehicle 408 may be suspended by two cables (e.g., the capture cable 410 and the secondary capture device 422), thereby allowing for minimal lateral and/or longitudinal movements. Using these cables, the aerial vehicle 408 can be loaded and offloaded from the ship using the crane 402. The cables may be controlled (e.g., let out/let in) using, for example, one or more winches coupled to, or integrated with, the cable management device 416 and/or shuttle cable management device 418.

In shipboard operation, the crane 402 may be configured to hold the rail 404 and the translating shuttle 406 over the side of the ship such that the aerial vehicle's 408 direction of travel is substantially parallel to the ship's structure. Using this configuration, the risk of crashing the aerial vehicle 408 into the ship is greatly reduced because the aerial vehicle 408 is not flying towards the ship's structure. Contrast this with previous methods, which, as described above, often placed a net toward the rear of the ship.

In certain aspects, the rail 404 or crane may be configured with a mast for installation of line-of-sight ("LOS") communications antennas. The elevated position of the top of the recovery system structure provides enhanced field of regard with reduced obstructions relative to other mounting alternatives.

Figure 4C:
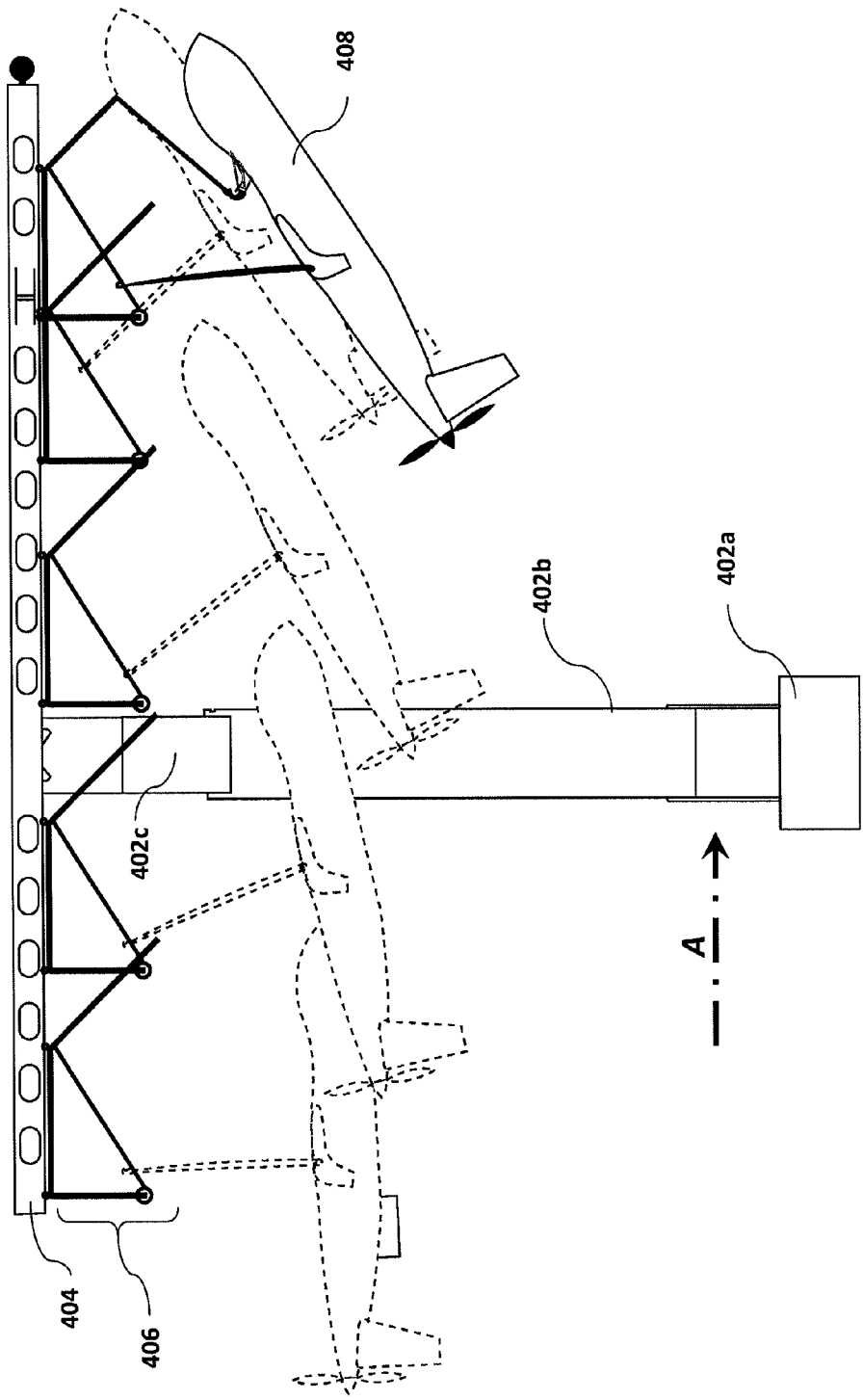
FIG. 4c illustrates a side view of a side-arm recovery system of FIGS. 3a-3g.

FIG. 4c illustrates a side view of a side-arm recovery system 400 depicting an aerial vehicle 408 during various phases of recovery (depicted using dotted lines) with the final capture phase being depicted using solid lines. As illustrated in the figure, both the primary and secondary recovery hooks may be engaged with the aerial vehicle 408 in a pitched up position. Also, as illustrated, the shuttle 406 is at the limit of its forward travel range (direction A) along the rail 404. To prevent the shuttle 406 from sliding off the end of the rail 404, a dead stop device may be used. For example, the shuttle cable management device 418 may be configured to lock once a predetermined amount of shuttle cable 420 has been let out, thus stopping the shuttle 406 from traveling beyond the end of the rail 404. Moreover, a protruding peg may be positioned toward the end of the rail 404 to prevent the shuttle 406 from sliding off the end of the rail 404. Alternatively, a safety mechanism may permit the shuttle and air vehicle to slide off the rail to prevent excessive loads on the ship if the capture energy is too high (excessive velocity).

Figure 5:
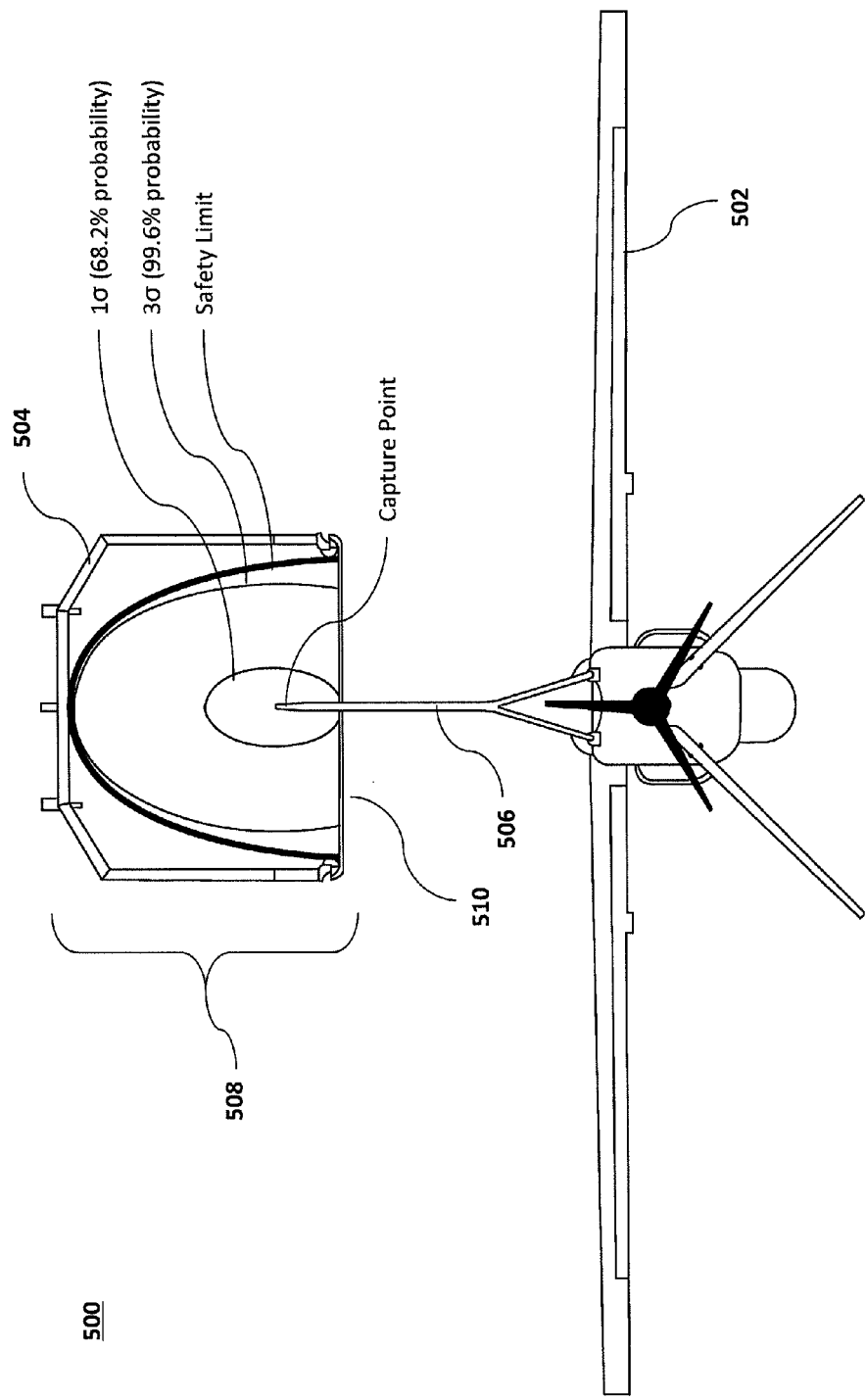
FIG. 5 illustrates a rear alignment view of an aerial vehicle during descent into a shuttle with its top-hook assembly in the extended position.

FIG. 5 illustrates a rear view of an aerial vehicle 502 during descent into a shuttle 504 with its top-hook assembly 506 in the extended position. The recovery trapeze 508 formed by the shuttle 504 and the capture wire 510 may be configured to ensure a greater than 3-σ probability (99.6% probability) of missing recovery system structure and a greater than 1-σ probability (68.2% probability) of capture. Naturally, the probability of capture and impact may be tuned for new applications as desired by a designer/operator.

Less than 1 meter 1-σ accuracy can be achieved consistently using Real Time Kinematic ("RTK") Global Positioning System ("GPS") or other forms of differential GPS, even in the presence of ship motion, winds, and turbulence off the ship's deck. The trapeze 508 may be configured so that the 3-σ boundary for the arresting hook position at the end of the top-hook assembly 506 falls within the outline of the shuttle's 504 frame. Thus, a target point may be situated above the wire 510 in a biased position in order to guarantee greater than 1-σ capture probability because the shuttle 504 is positioned over, for example, water. Thus, all low misses result in a safe go-around.

High-bandwidth flaps may be used as direct lift-control effectors to reduce vertical tracking errors. This allows the shuttle capture envelope to be reduced in size. The flaps may increase or decrease the wing lift to reduce tracking errors.

Figure 6A:
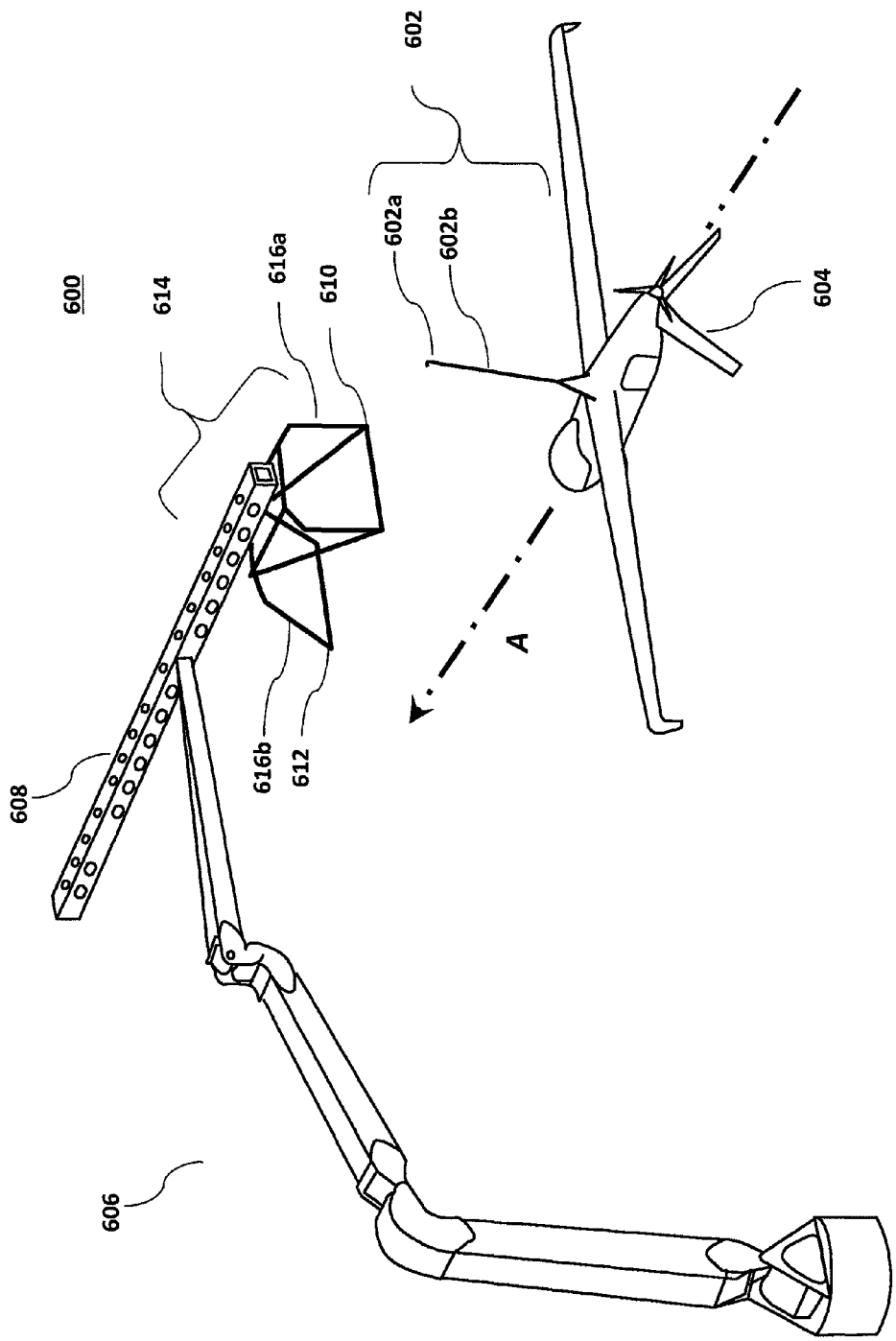
FIG. 6a illustrates an aerial vehicle during final approach to a side-arm recovery system.
Figure 6B:
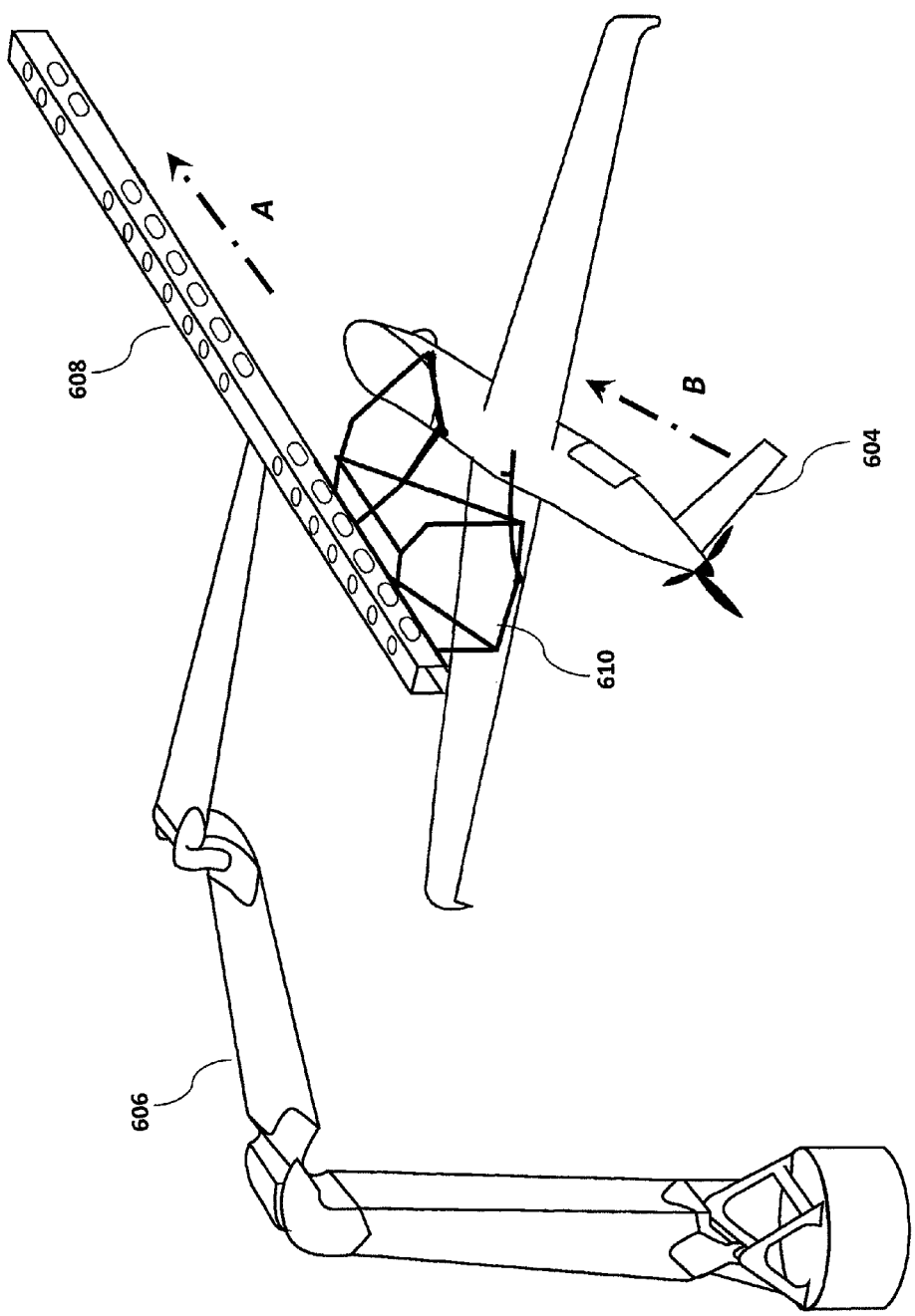
FIG. 6b illustrates an aerial vehicle during the capture phase and/or first arresting phase.
Figure 6C:
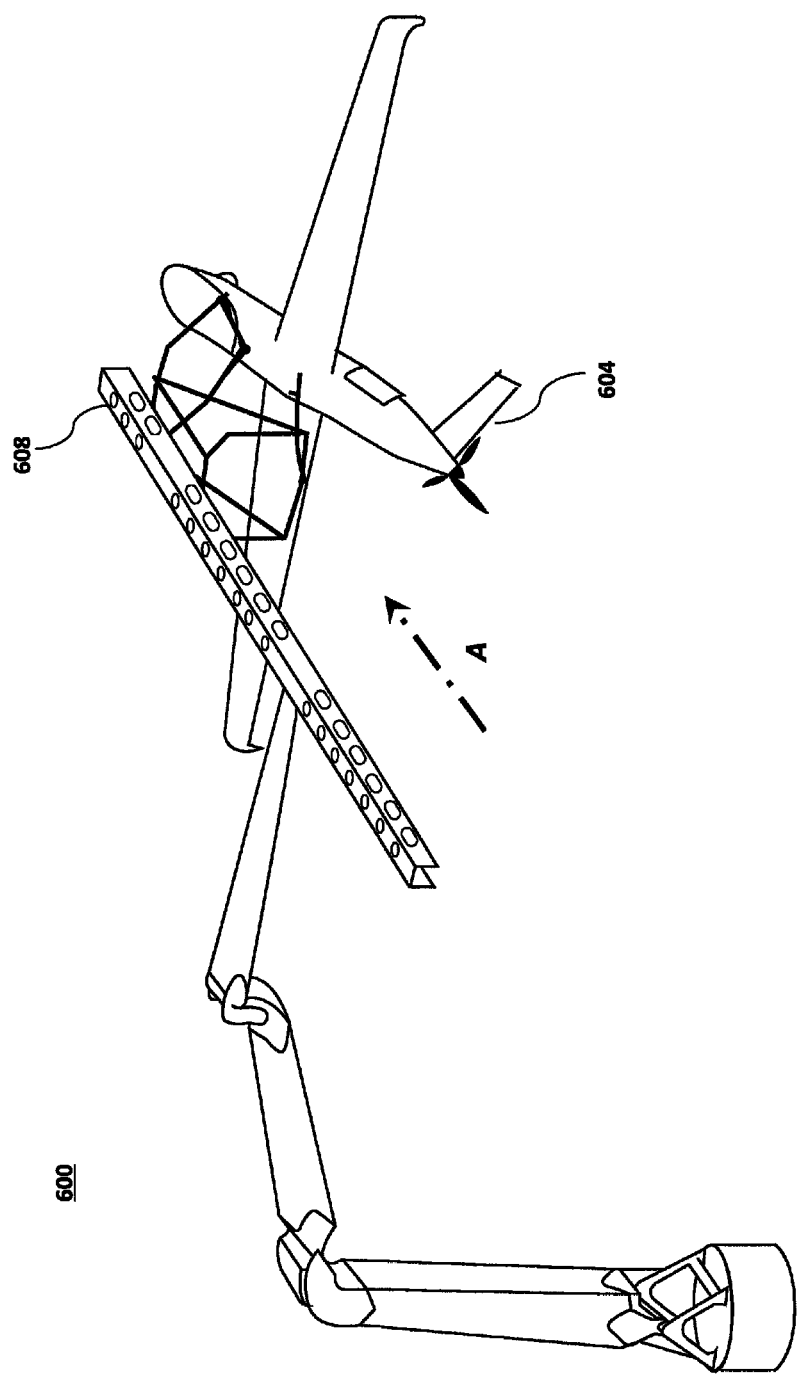
FIG. 6c illustrates an aerial vehicle 604 during the second arresting phase.

The recovery sequence, depicted in FIGS. 6*a*-6*c*, illustrates the aerial vehicle 604 approaching the side-arm system 600 just prior to hook engagement. After hook engagement, the aerial vehicle 604 is slowed to a stop using the above-described techniques and returned to the ship deck using, for example, the articulating crane 606 arm. The recovery scheme is tolerant to failure of the primary hook to engage, wherein the aerial vehicle 604 just continues flying along the side of the ship and returns for another attempt. An example of such a sequence is explained in more detail below.

For example, FIG. 6*a* illustrates an aerial vehicle 604 during final approach to the side-arm recovery system 606. On approach, the aerial vehicle 604 aligns its trajectory with the rail 608 axis and extends the top-hook assembly from the fuselage to an upright position (i.e., extended position). The aerial vehicle 604 aligns its trajectory such that the tip of the hook aims towards the objective capture point of FIG. 5, thereby presenting the best probability of capture while avoiding all interference with the shuttle structure.

FIG. 6*b* illustrates the aerial vehicle 604 during the capture phase and first arresting phase. The hook 602*a* first strikes the cable 610 (stretched across the shuttle rear support stanchions 616*a*), which may cause the arm 602*b* to bend back slightly. The aerial vehicle 608 attitude is minimally affected as the aerial vehicle 608 continues forward (direction A). The cable 610 then slides along the top-hook assembly 602 and into, for instance, a retainer positioned at the tip of the hook 602*a*. Because the cable 610 is initially orthogonal to the top-hook assembly 602, the initial strike action does not impart a large shock to the aerial vehicle 604. After the cable 610 is engaged, the aerial vehicle 604 draws the cable 610 through the hook 602*a*. As the cable 610 pays out according to the previously described techniques, the force on the aerial vehicle 604 increases rapidly because of the combined effect of the direction and magnitude of the cable tension. The magnitude of the cable tension may be proportional to the cable 610 pay-out velocity. As the cable pay-out length increases, the angle of cable relative to the hook decreases and the action of the cable on the hook increases. The action of the cable tends to align the aerial vehicle 604 center of mass with the end of the shuttle stanchions through the hook. Because of the offset of the hook pivot, the aerial vehicle 604 pitches up (direction B). The shuttle 614 is entrained forward and accelerates proportionally to its mass. The first arresting phase leads up to the peak deceleration.

FIG. 6*c* illustrates an aerial vehicle 604 during the second arresting phase. As the aerial vehicle 604 decelerates, the magnitude of the cable tension decreases as the cable pay-out velocity decreases. Concurrently, like a pendulum, some of the aerial vehicle 604 kinetic energy is transferred into potential energy. The shuttle cable reels in, pulling the aerial vehicle 604 and the shuttle 614 closer. The shuttle 614 accelerates and follows the aerial vehicle 604 preventing the aerial vehicle 604 from swinging back. As the aerial vehicle 604 goes up, the aerial vehicle's secondary fuselage hook may capture a secondary cable 612 stretched across the shuttle forward support stanchions 616*b*.

The secondary cable 612 applies a downward force on the aerial vehicle 604 during the third arresting phase, and the aerial vehicle's 604 forward velocity continues to decrease as the shuttle's velocity decreases. Meanwhile the aerial vehicle's 604 potential energy may be transferred to the secondary cable absorption device 612. The shuttle 614 stops when the forward force is lower than the friction resistance between the shuttle 614 and the rail 608. In addition, as mentioned above, a dead stop prevents the shuttle 614 from sliding off the rail 608. After the aerial vehicle's 604 potential energy is transferred, the aerial vehicle 604 slowly oscillates to a resting position. Naturally, the above-described sequence may be varied or tweaked depending on the designers needs and/or a number of variables, including, for example, the type of aircraft, the weather, position of the side-arm recovery system and so on.

Figure 7:
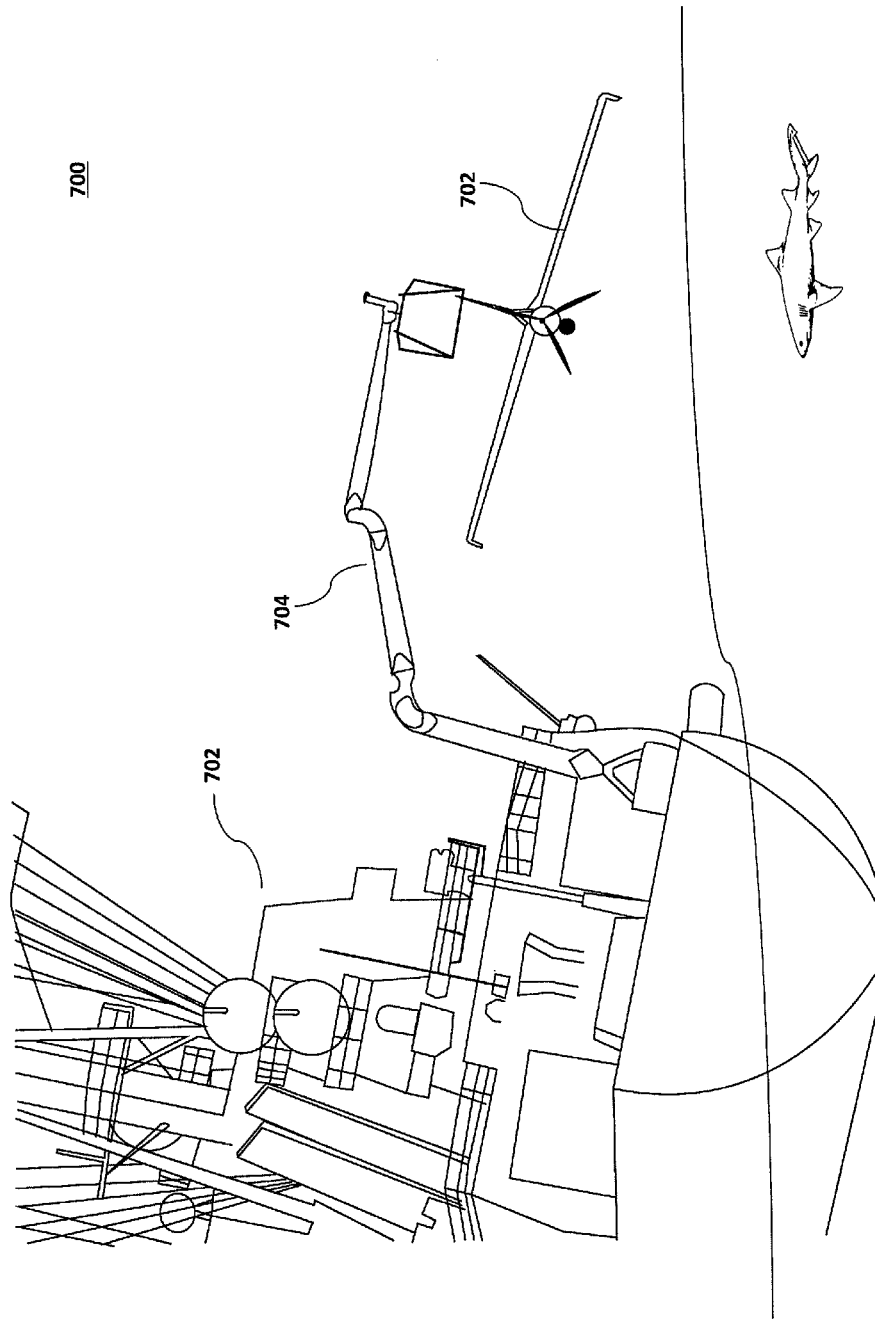
FIG. 7 illustrates a shipboard, side-arm recovery system in high sea states.

As illustrated in FIG. 7, the side-arm recovery system 700 may be designed to operate in high sea states (6-7). In oceanography, a sea state is the general condition of the free surface on a large body of water—with respect to wind waves and swell—at a certain location and moment.

The scenario of FIG. 7 involves 10 degrees ship roll and 6 degrees ship pitch with waves reaching 8 feet above the nominal sea surface. The crane's 704 sizing criterion may be chosen such that a minimum clearance (e.g., 1 to 40 feet, more preferably 5 to 30 feet, most preferably at least 10 feet) between the inner wingtip of the aerial vehicle 702 and all elements of the ship 702 and crane 704 is required under the most critical conditions. This criterion may be used to determine the lengths of the crane 704 elements for a particular aerial vehicle 702. The overall height of the crane 704 may be determined by allowing sufficient clearance from the outer wingtip to the highest wave height while in a 20-degree roll away from the ship 602. The size of the side-arm recovery system 700 may be driven by ship 702 geometry, ship orientation, wave height, keep-out zones, and aircraft clearance margins from the ship, water, and recovery system structure.

Figure 8A:
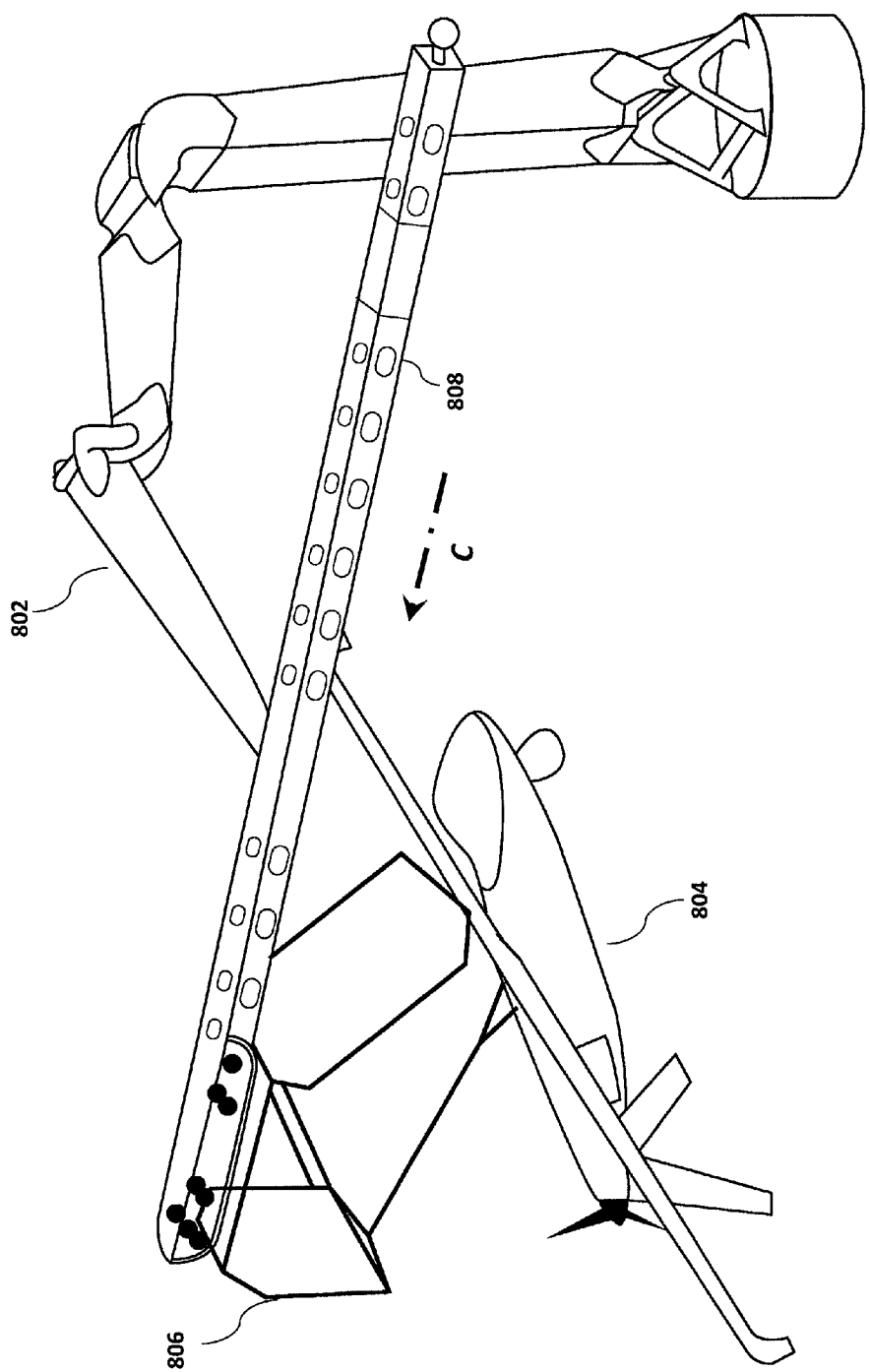
FIGS. 8a though 8c illustrate the various phases of aerial vehicle stowage.
Figure 8B:
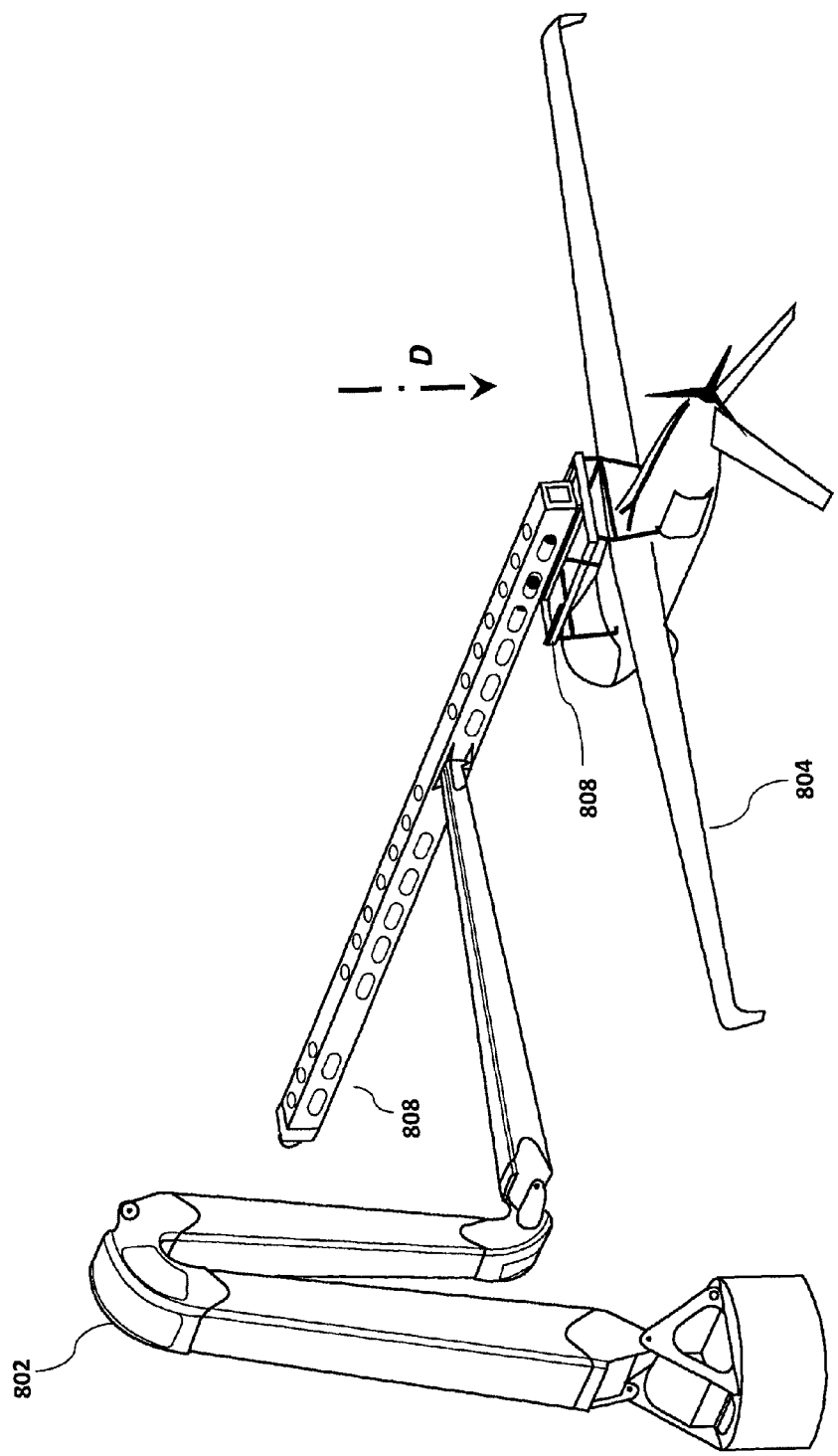
Figure 8C:
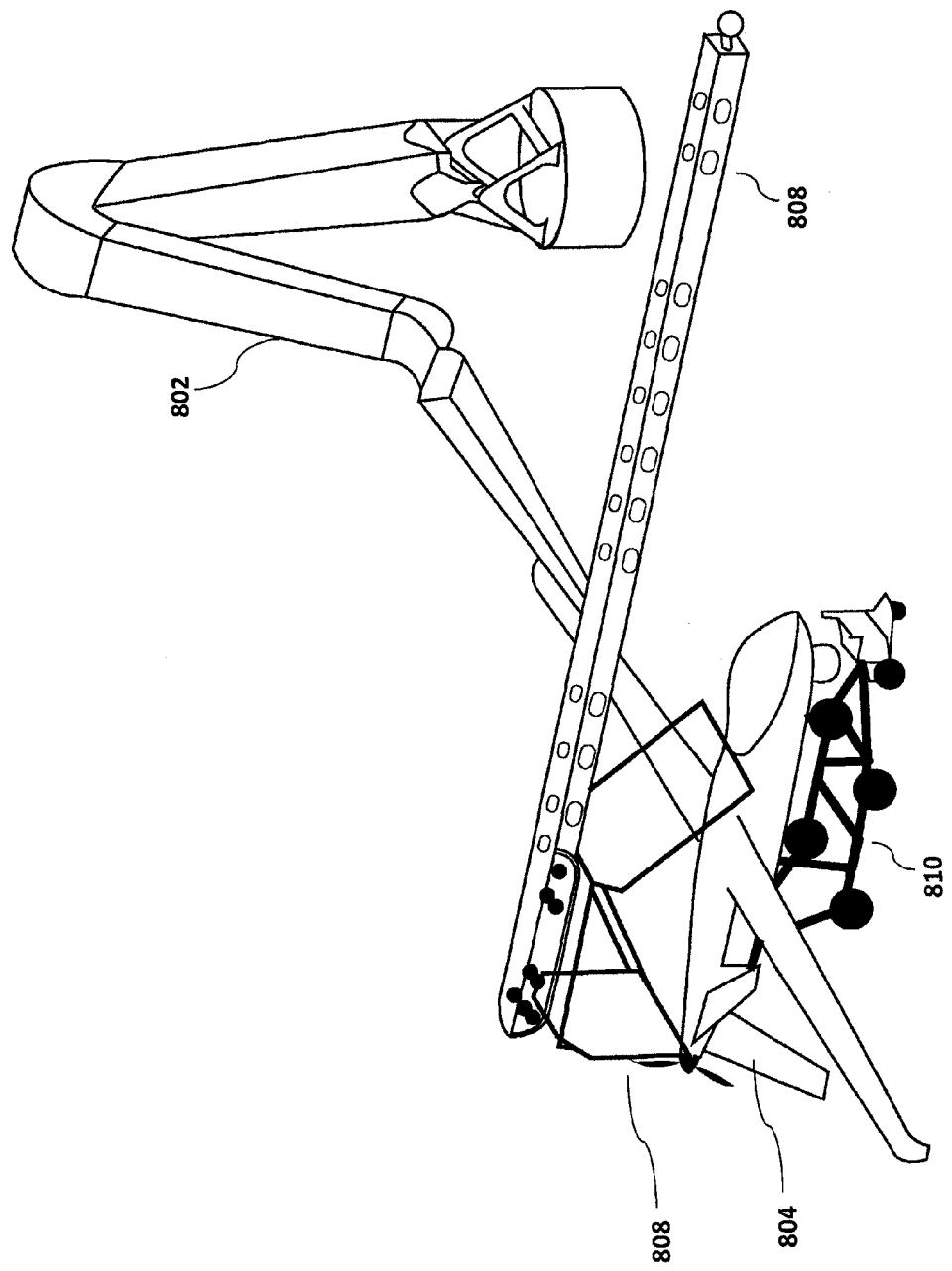
Figure 9A:
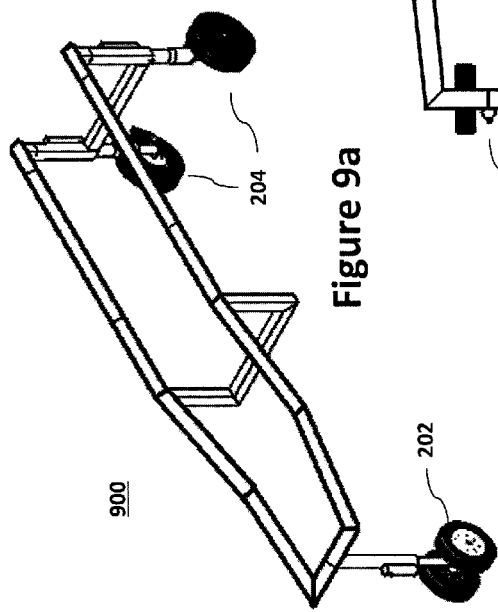
FIGS. 9a through 9d illustrate a cart suitable for the on-deck handling of an aerial vehicle.
Figure 9C:
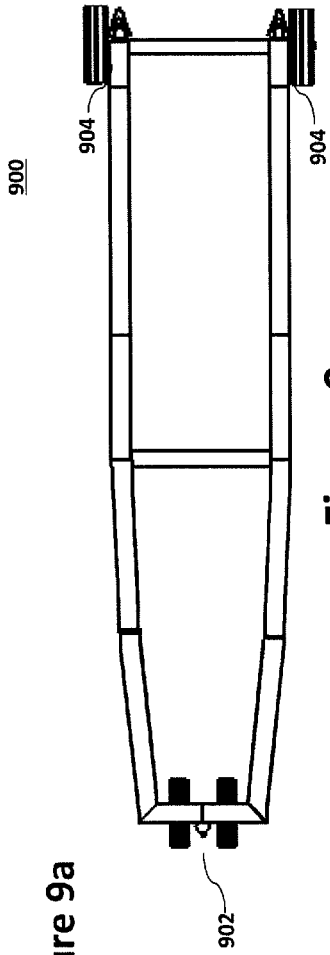
Figure 9B:
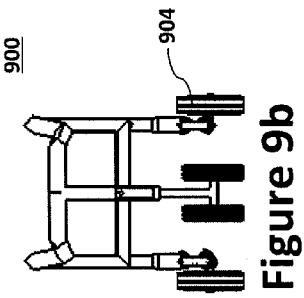
Figure 9D:
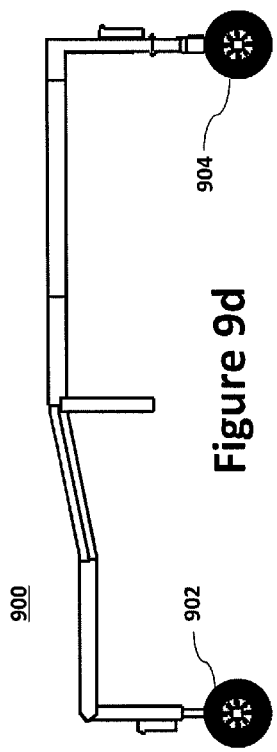

As previously discussed, the crane 802 is fully articulating (i.e., adjustable). Thus, the crane 802 may be used to relocate and/or transport an aerial vehicle 804 during the recovery phase. For example, the crane 802 may be used to move the aerial vehicle 804 so that it may be serviced or stowed. FIG. 8a illustrates the first step of an aerial vehicle 804 stowage phase. Specifically, the aerial vehicle 804, while secured in the shuttle 806, slides from the second end of the rail 808 (e.g., the final phase during recovery) in the reverse direction (direction C) until the shuttle 806 has reached the first end of the rail 808. As illustrated in FIG. 8b, the crane 802 may be used to bring the aerial vehicle 804 aboard the ship where it may be lowered onto the deck and/or a cart 810. FIG. 8c illustrates the side-arm system at the end of the recovery phase. The aerial vehicle 804 may be secured by the shuttle 808 while the crane is folded to facilitate lowering of the aerial vehicle 804 onto a cart 810 positioned on the ship's deck. The cart 810 may be used for deck handling.

To minimize shipboard footprint and specialized operations, the side-arm device can be configured for launch operations with minimal configuration change. The launch and capture peak accelerations are minimized. For example, the pivoting base of the side arm may be reoriented 90 degrees in azimuth, enabling a wide effective wind-over-deck range while minimizing operational impacts on the ship for both launch and recovery. The side-arm crane can also be adapted to support the retrieval of Autonomous Underwater Vehicles ("AUVs") or small surface craft.

To reduce weight and cost, the aerial vehicle may lack a conventional landing gear, relying instead on a ground cart for deck handling and hangar stowage. Specifically, following recovery of the aerial vehicle, the side-arm recovery system safely lowers the aircraft to a deck handling cart. FIGS. 9a through 9d illustrate a cart 900 suitable for deck handling. As illustrated in the figures, the cart 900 may feature a square-cross-section, tubular steel frame and, for example, a tricycle configuration. Any tie-downs that are normally found on the landing gear of an aerial vehicle may be relocated to the cart 900 in accordance with known standards, such as the principles of U.S. Department of Defense's AIR-STD-25. The aerial vehicle may be configured to interface with the cart 900 using, for example, padded support structures in correspondence with the aerial vehicle's main bulkheads and at a number of pickup points consisting of profiled stubs situated in correspondence with the weapons bay forward and aft bulkheads.

Twin nose wheels 902 and the two aft wheels 904 may be lowered and/or raised individually, or in unison, to achieve a more favorable stance depending on ground handling actions. When moving the cart 900, a lowered stance offers a lower center of gravity and a more stable platform. While secured with tie-downs, the raised position offers increased access to the underside of the aerial vehicle for ease of maintenance and loading of ordnance. Raising the aft wheels 904 and lowering the nose wheels 902 lets the aerial vehicle assume a position that facilitates wheeling a replacement engine under the aft fuselage to hoist into the engine compartment. The design of the cart 900 frame may be designed to provide ease of access to maintenance-heavy areas such as the payload bay, engine compartment, avionics hatches, and EO/IR ball, and topside to the SATCOM radome. The shape of the frame skirts these areas and joins to strong airframe structural interfaces while achieving unimpeded accessibility to the desired areas.

Unlike an aerial vehicle, the design of the ground cart 900 is not hampered by airworthiness and aerodynamic performance constraints, thus it can be given better maneuverability and handling than that achievable by helicopters or aircraft being towed on their wheeled landing gear. In fact, the cart 900 may be designed with a nose wheel 902 that is compatible with the A/S32A-32 aircraft towing tractor as well as the Shipboard Helo Handler (SHH).

Figure 10:
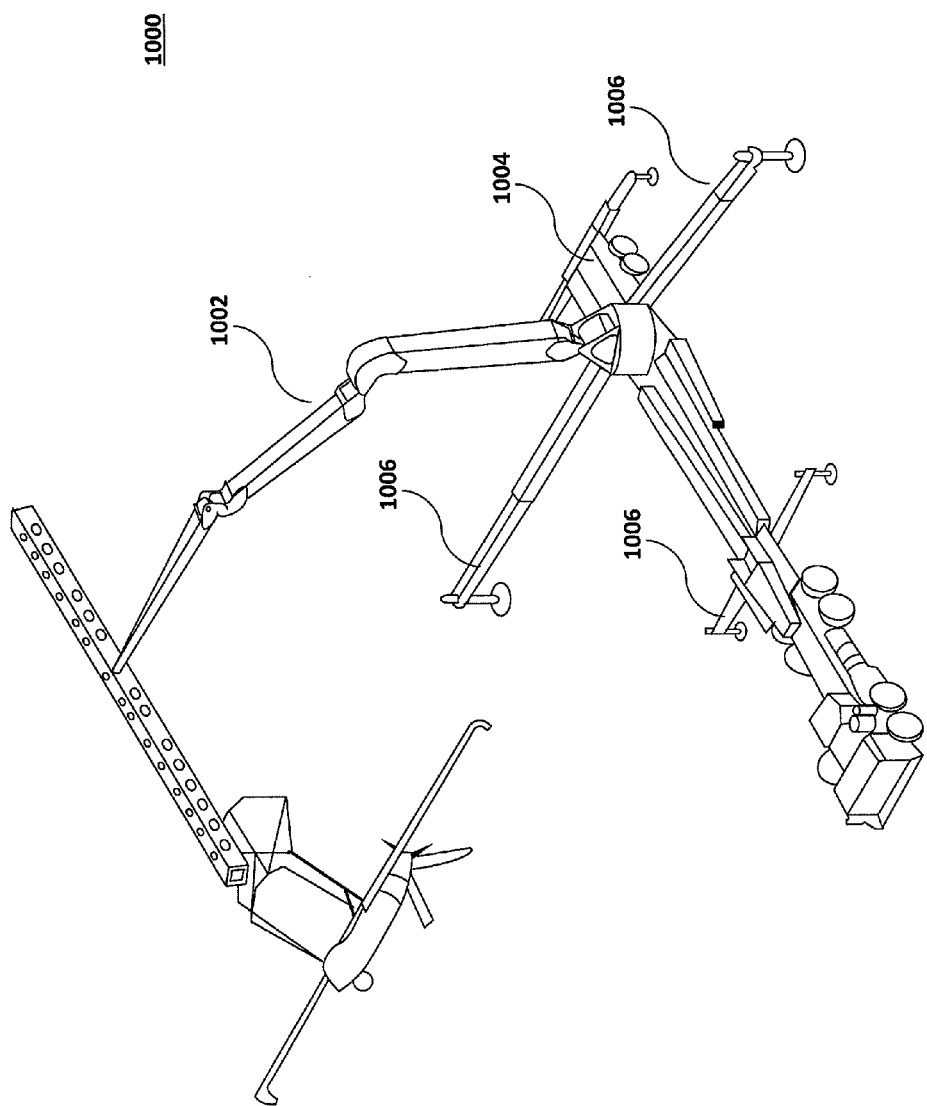
FIG. 10 illustrates a land-based recovery system.

FIG. 10 illustrates land-based recovery system 1000. The land-based recovery system's 1000 operation is substantially the same as the previously described shipboard operation. However, the size of land-based recovery system 1000 is determined by the base geometry (such as a trailer), aircraft ground clearance for defined terrain, aircraft clearance from the recovery system, and height constraints due to vehicle obstacle clearance and glideslope. While the land-based recovery system 1000 of FIG. 10 illustrates a trailer-truck system, the trailer-truck system may be implemented with a virtually comparable vehicle or even a permanent structure, such as a building. A trailer-truck system generally comprises a crane 1002 mounted on a wheeled chassis 1004. This chassis 1004 can ride on the trailer. To prevent tipping, the trailer-truck system may be provided with one or more ground supports 1006 (e.g., outriggers and jacks), which increase the footprint, thereby providing greater stability.

The trailer-truck system may employ a single-engine machine, with the same engine powering the undercarriage and the crane 1002. The upper portion (e.g., the articulated boom) may be powered via hydraulics run through the turntable from the pump mounted on the lower portion (e.g., the truck and/or trailer). However, it is possible to employ two engines. For example, a first engine may be located in the lower portion and used for moving the vehicle down the road and running a hydraulic pump for operating the one or more ground supports 1006. A second engine may be located in the upper portion and used to operate a hydraulic pump for the articulating crane.

Although the present invention has been described with respect to what are currently considered to be the preferred embodiments, the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents, all articles, all brochures, and all other published documents discussed above are hereby incorporated by reference into the Detailed Description of the Preferred Embodiment.

What is claimed is:

1. An aerial vehicle recovery system, comprising:
   an articulating crane;
   a rail positioned at a distal end of said articulating crane;
   a shuttle slideably coupled with said rail;
   a first set of two stanchions mounted to said shuttle;
   a second set of two stanchions mounted to said shuttle;
   a first capture cable stretched across said first set of two stanchions, the first capture cable capturing a first hook on an aerial vehicle; and
   a second capture cable stretched across said second set of two stanchions, the second capture cable capturing a second hook on the aerial vehicle, the second hook being spaced apart from the first hook, wherein the second capture cable reduces post-capture motion of the aerial vehicle caused by capture of the aerial vehicle by said first capture cable.

2. The aerial vehicle recovery system of claim 1, wherein the articulating crane comprises a rotating base.

3. The aerial vehicle recovery system of claim 1, wherein each of said first capture cable and said second capture cable is stretched horizontally across its corresponding set of two stanchions.

4. The aerial vehicle recovery system of claim 1, wherein the first capture cable is coupled to a shock absorbing device.

5. The aerial vehicle recovery system of claim 4, wherein said second capture cable is disposed forward of said first capture cable.

6. The aerial vehicle recovery system of claim 1, wherein the second a hook is positioned on a front end of the aerial vehicle.

7. The aerial vehicle recovery system of claim 6, wherein the second hook is engaged with the second capture cable through upward angular momentum of the aerial vehicle generated from initial deceleration of the aerial vehicle.

8. The aerial vehicle recovery system of claim 1, wherein forces and moments imparted by the aerial vehicle are transferred to the articulating crane.

9. The aerial vehicle recovery system of claim 1, wherein the rail folds to facilitate stowage.

10. An aerial vehicle, comprising:
a fixed wing;
a fuselage;
a propulsion device;
a top hook assembly, the top hook assembly comprising a hook portion and a retractable arm portion, wherein the retractable arm portion is hingedly coupled to a top side of said fuselage;
an extension mechanism configured to extend and retract the retractable arm portion; and
a second top hook assembly disposed forward of said top hook assembly, and engaging a different capture cable than the top hook assembly's hook portion.

11. The aerial vehicle of claim 10, wherein said top hook assembly acts as a spring-damper for capture loads.

12. The aerial vehicle of claim 10, wherein the retractable arm portion is coupled to the top side of said fuselage via a central bulkhead.

13. The aerial vehicle of claim 12, wherein the central bulkhead serves as a wing carry-through structure.

14. The aerial vehicle of claim 10, wherein the top hook assembly's hook portion and retractable arm portion are formed as a single element of a fixed length.

15. The aerial vehicle of claim 10, wherein the top hook assembly's retractable arm portion is formed from multiple elements and configured to fold.

16. The aerial vehicle of claim 10, wherein the top hook assembly's retractable arm portion is telescopic.

17. The aerial vehicle of claim 10, wherein the top hook assembly is positioned aft of the aerial vehicle's center of mass.

18. An aerial vehicle recovery apparatus, comprising:
a rail;
a shuttle slideably coupled with said rail, wherein the shuttle comprises a first set of two stanchions, a second set of two stanchions, and wherein the shuttle is coupled with said rail via a shuttle cable;
a first capture cable stretched across said first set of two stanchions, the first capture cable capturing a first hook on an aerial vehicle; and
a second capture cable stretched across said second set of two stanchions, the second capture cable capturing a second hook on the aerial vehicle, wherein the said second capture cable reduces post-capture motion of the aerial vehicle, wherein the first capture cable and second capture cable engage different portions of the aerial vehicle.

19. The aerial vehicle recovery apparatus of claim 18, wherein each of said first capture cable and said second capture cable is stretched horizontally across its corresponding set of two stanchions.

20. The aerial vehicle recovery apparatus of claim 18, wherein said first capture cable is coupled to a shock absorbing device.

21. The aerial vehicle recovery apparatus of claim 20, wherein the second hook is positioned on a front end of the aerial vehicle.

22. The aerial vehicle recovery apparatus of claim 20, wherein second capture cable is disposed forward of said first capture cable.

23. The aerial vehicle recovery apparatus of claim 18, wherein the rail folds to facilitate stowage.

\* \* \* \* \*